(12) United States Patent
Inamoto et al.

(10) Patent No.: US 8,605,336 B2
(45) Date of Patent: Dec. 10, 2013

(54) IMAGE PROCESSING APPARATUS, IMAGE PROCESSING SYSTEM, AND IMAGE CONDUCTING CHARACTER RECOGNITION WITH RESPECT TO IMAGE DATA

(75) Inventors: Hirohisa Inamoto, Kanagawa (JP); Koji Kobayashi, Kanagawa (JP); Yuka Kihara, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 413 days.

(21) Appl. No.: 12/872,243

(22) Filed: Aug. 31, 2010

(65) Prior Publication Data

US 2011/0058228 A1 Mar. 10, 2011

(30) Foreign Application Priority Data

Sep. 4, 2009 (JP) ................................. 2009-205157
Feb. 12, 2010 (JP) ................................. 2010-029358

(51) Int. Cl.
*G06F 3/12* (2006.01)
*G06K 15/00* (2006.01)
*G06K 9/60* (2006.01)
*G06K 9/54* (2006.01)
*H04N 1/40* (2006.01)
*H04N 1/387* (2006.01)

(52) U.S. Cl.
USPC ......... 358/448; 358/1.15; 358/1.16; 358/452; 358/462; 382/305; 382/306

(58) Field of Classification Search
USPC ......... 258/474; 358/448, 474, 1.15, 403, 496, 358/498, 471, 464, 462, 452, 450, 444, 358/426.04, 401, 538, 540, 539, 1.16, 3.21, 358/1.6, 1.4, 1.1; 235/375, 494, 495, 438, 235/468, 470, 569, 469, 402, 462.01, 235/462.24, 462.25, 477; 382/306, 305, 382/137, 139
See application file for complete search history.

(56) References Cited

U.S. PATENT DOCUMENTS

| | | | | |
|---|---|---|---|---|
| 3,582,884 | A * | 6/1971 | Shepard | 382/245 |
| 3,900,961 | A * | 8/1975 | Sokolski et al. | 434/363 |
| 4,217,487 | A * | 8/1980 | Kjeer | 235/468 |
| 4,760,246 | A * | 7/1988 | Shepard | 235/454 |
| 5,140,139 | A * | 8/1992 | Shepard | 235/456 |

(Continued)

FOREIGN PATENT DOCUMENTS

JP 1-150974 6/1989
JP 9-134406 5/1997

(Continued)

OTHER PUBLICATIONS

Extended European Search Report issued Feb. 4, 2013 in Patent Application No. 10251548.3.

(Continued)

*Primary Examiner* — Ngon Nguyen
(74) *Attorney, Agent, or Firm* — Oblon, Spivak, McClelland, Maier & Neustadt, L.L.P.

(57) ABSTRACT

An image processing apparatus is disclosed, including a marking position detection part and a first character recognition part. The marking position detection part detects a marking position with respect to a first sheet based on first image data scanned from the first sheet. The first character recognition part conducts a first character recognition with respect to an area specified based on the marking position, for second image data scanned from a second sheet.

16 Claims, 36 Drawing Sheets

(56) References Cited

U.S. PATENT DOCUMENTS

| | | | |
|---|---|---|---|
| 6,035,061 A | 3/2000 | Katsuyama et al. | |
| 7,446,892 B1 * | 11/2008 | Churchill et al. | 358/1.15 |
| 7,573,616 B2 * | 8/2009 | Poor | 358/474 |
| 7,681,121 B2 * | 3/2010 | Nishikawa et al. | 715/243 |
| 8,014,040 B2 * | 9/2011 | Rosenfeld et al. | 358/474 |
| 2004/0190772 A1 | 9/2004 | Constantin et al. | |
| 2005/0226541 A1 * | 10/2005 | McIntosh et al. | 382/306 |
| 2008/0187221 A1 | 8/2008 | Konno et al. | |
| 2009/0077164 A1 | 3/2009 | Phillips et al. | |
| 2009/0092317 A1 | 4/2009 | Nagarajan et al. | |
| 2010/0072269 A1 * | 3/2010 | Scott et al. | 235/375 |

FOREIGN PATENT DOCUMENTS

| | | |
|---|---|---|
| JP | 9-274643 | 10/1997 |
| JP | 2008-77454 | 4/2008 |
| JP | 2009-27648 | 2/2009 |
| WO | WO 2008/081666 A1 | 7/2008 |

OTHER PUBLICATIONS

H. Bunke et al., "Handbook of Character Recognition and Document Analysis", World Scientific, XP-002500785, Jan. 1, 1997, pp. 17-18, pp. 128-131, pp. 238-241.

Asprey L. Middleton M., "Integrative Document and Content Management : Strategies for Exploiting Enterprise Knowledge", Idea Group Publishing, XP-002690963, Jan. 27, 2003, pp. 367-368.

Office Management : Developing Skills for Smooth Functioning : "Dubey N B", Global India Publications PVT Ltd, XP-002690964, Dec. 31, 2009, pp. 193-194.

* cited by examiner

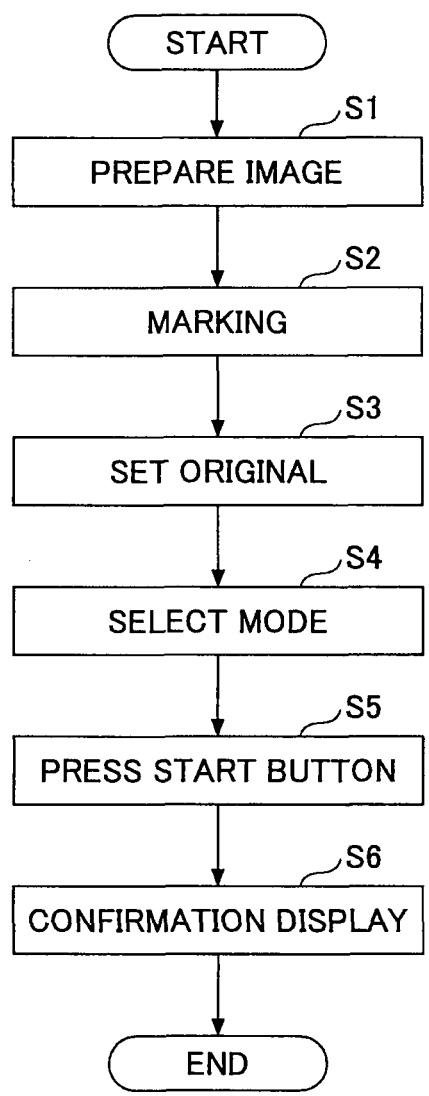

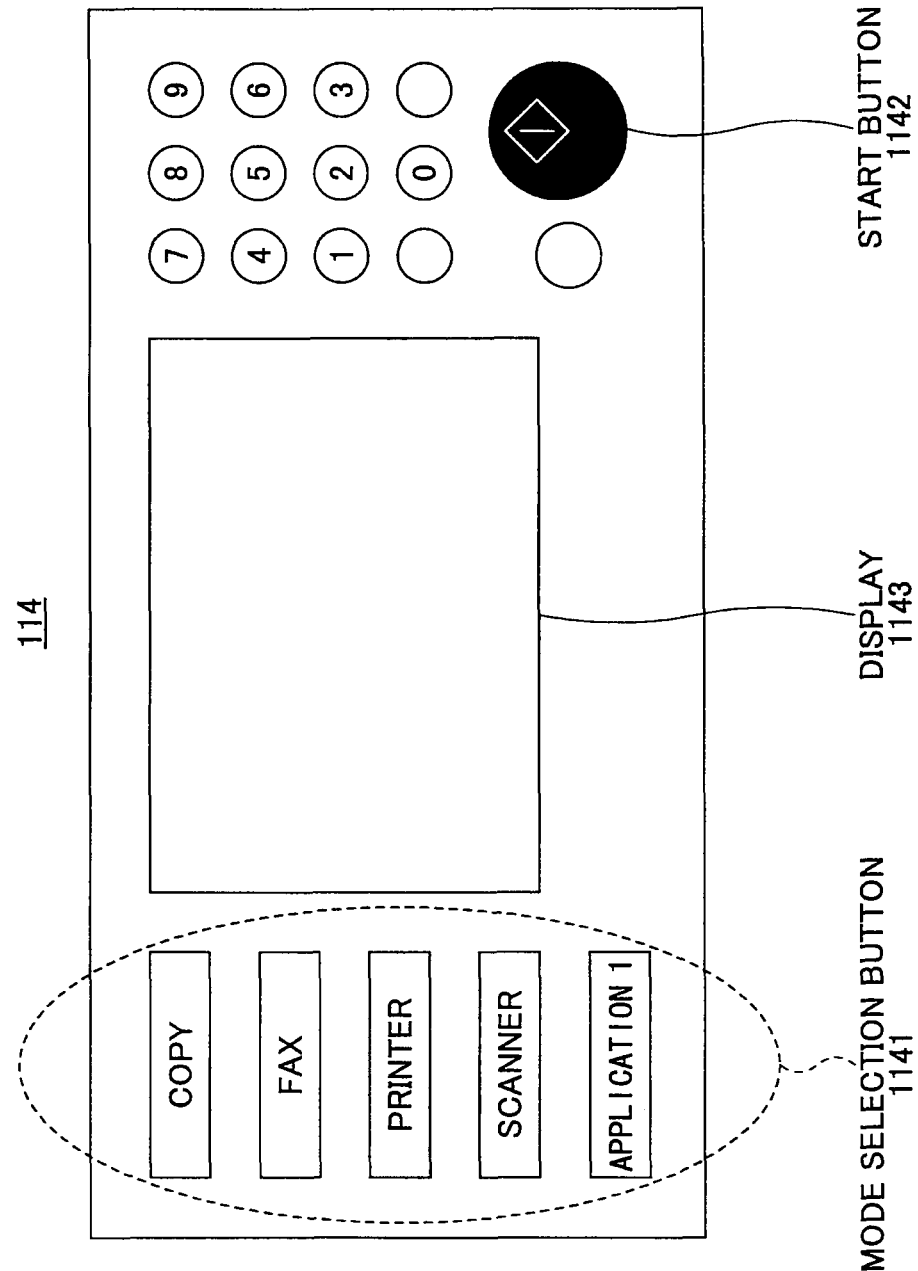

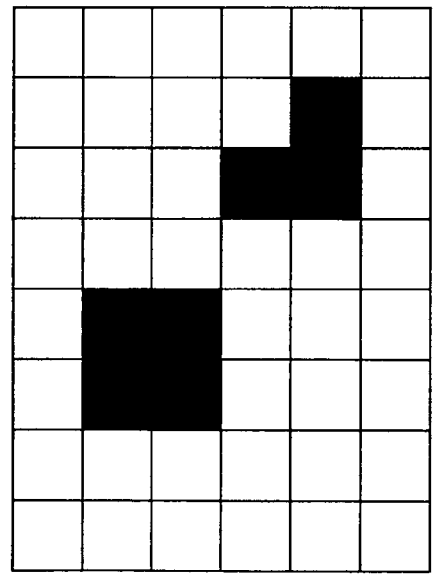

| 私|は、|　|そ|の|男|の|写|真|を|三|葉、|　|見|た|こ|と|が|あ|る。|　|
|一|葉|は、|　|そ|の|男|の、|　|幼|年|時|代、|　|と|で|も|言|う|べ|き|で|あ|ろ|う|か、|
|取|り|か|こ|ま|れ、|　|（|そ|れ|は、|　|そ|の|子|供|の|姉|た|ち、|　|妹|た|ち、|　|そ|れ|か|
|の|袴|（|は|か|ま|）|を|は|い|て|立|ち、|　|首|を|三|十|度|ほ|ど|左|に|傾|け、|　|醜|く|
|ど|に|関|心|を|持|た|ぬ|人|た|ち|）|は、|　|面|白|く|も|何|と|も|無|い|よ|う|な|顔|を|
|「|可|愛|い|坊|ちゃ|ん|で|す|ね|」|
|　|と|い|い|加|減|な|お|世|辞|を|言|っ|て|も、|　|ま|ん|ざ|ら|空|（|か|ら|）|お|世|辞|
|の|子|供|の|笑|顔|に|無|い|わ|け|で|は|な|い|の|だ|が、|　|し|か|し、|　|い|さ|さ|か|で|
|「|な|ん|て、|　|い|や|な|子|供|だ|」|

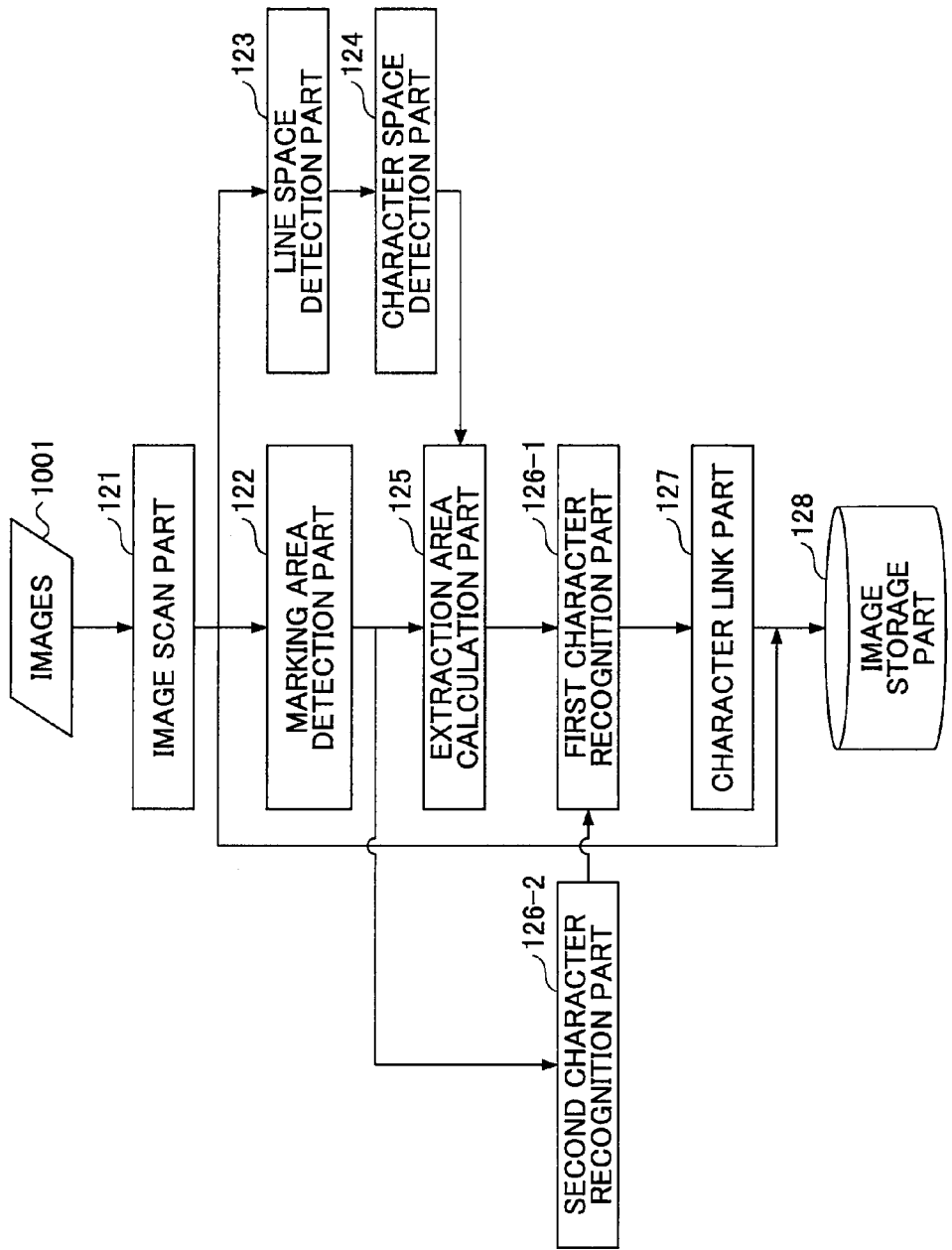

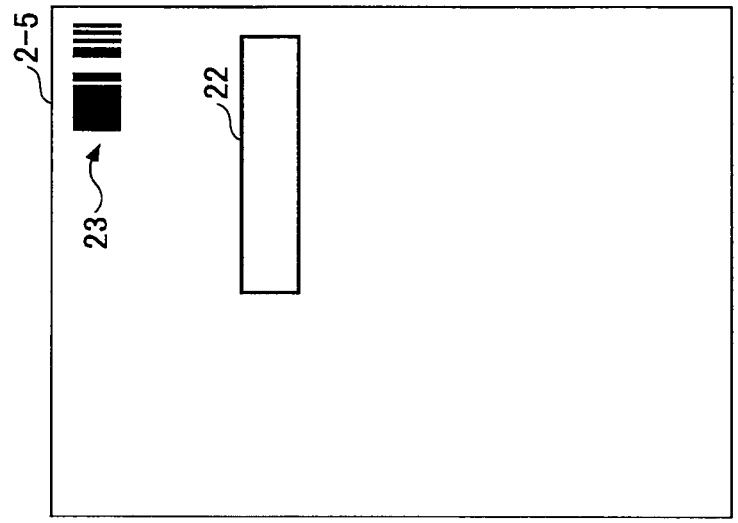
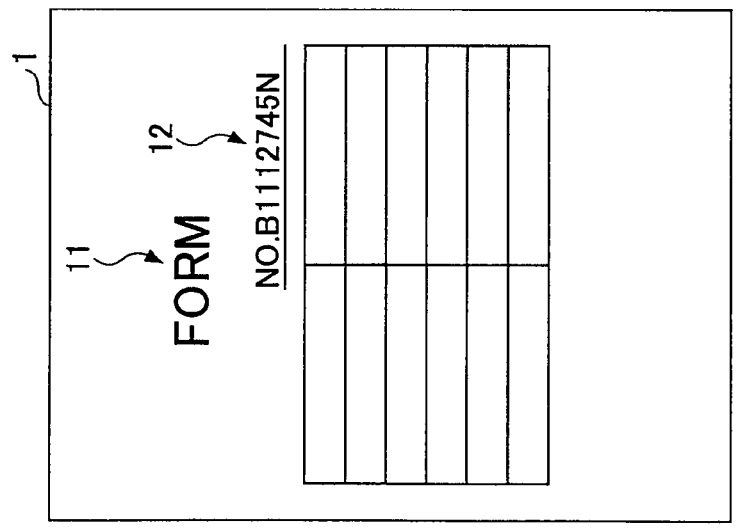

FIG.19A

| 13 | 14 |
|---|---|
| 090901 | 10,000 |
| 090902 | 25,000 |
| 090903 | 50,000 |
| 090904 | 13,500 |
| 090905 | 22,000 |
| 090906 | 31,500 |

| 24 | 25 |
|---|---|
| 1 | 2 |
| 1 | 2 |
| 1 | 2 |
| 1 | 2 |
| 1 | 2 |
| 1 | 2 |

| USER ID | URL TO ACQUIRE WIDGET INFORMATION | 336 |
|---------|-----------------------------------|-----|
| USER A  | http://xxxxxxx                    |     |
| USER B  | ...                               |     |
|         |                                   |     |

Note: 336 is a reference label for the table.

FIG.28

| | |
|---|---|
| WIDGET ID | print001 |
| USER ID | USER A |
| ASSOCIATION IDENTIFICATION | print |
| WIDGET ADDRESS | http://xxx/xxx/yyy |
| DISPLAY NAME | MARKING SHEET PRINT |
| SETTING INFORMATION | ... |
| PRINT DATA (MARKING SHEET DATA) | ... |
| PRINT DATA (FORM TEMPLATE DATA) | ... |

FIG.31

| WIDGET ID | print001 |
|---|---|
| USER ID | USER A |
| ASSOCIATION IDENTIFICATION | print |
| WIDGET ADDRESS | http://xxx/xxx/yyy |
| DISPLAY NAME | MARKING SHEET PRINT |
| URL TO RELAY WIDGET | http://yyyyyyyy |

FIG.35

| WIDGET ID | scan001 |
|---|---|
| USER ID | USER A |
| ASSOCIATION IDENTIFICATION | scan |
| WIDGET ADDRESS | http://xxx/xxx/yyy |
| DISPLAY NAME | FORM SCAN |
| SETTING INFORMATION | ... |

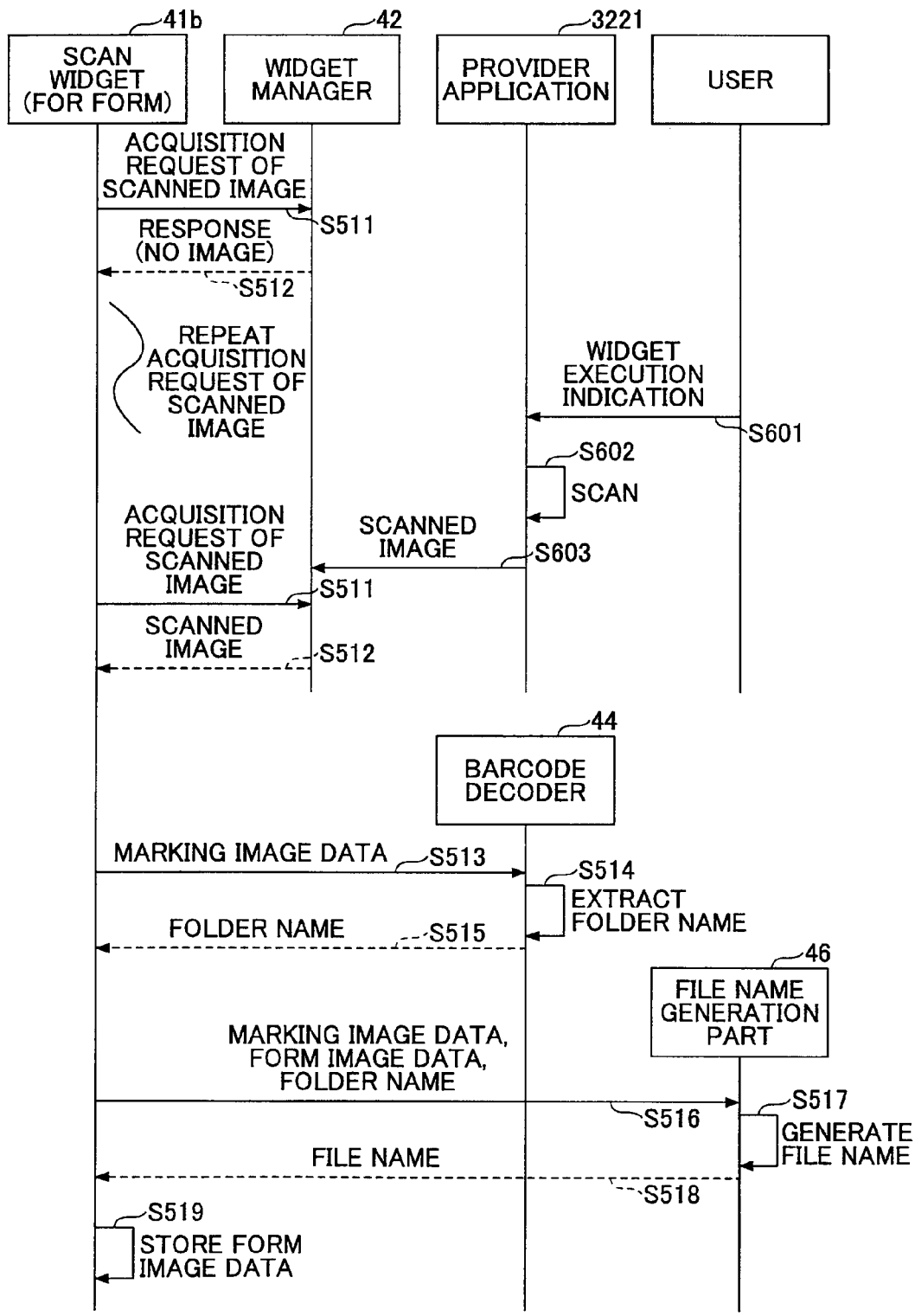

IMAGE PROCESSING APPARATUS, IMAGE PROCESSING SYSTEM, AND IMAGE CONDUCTING CHARACTER RECOGNITION WITH RESPECT TO IMAGE DATA

BACKGROUND OF THE INVENTION

1. Field of the Invention

The present invention is related to an image processing apparatus, an image processing system, and an image processing method, and in particular to, the image processing apparatus, the image processing system, and the image processing method, for conducting character recognition with respect to image data.

2. Description of the Related Art

Recently, according to a law revision, with respect to documents such as various types of financial and tax forms, minutes of board meeting, and the like, which are required by a business law and a tax law to be stored, it has been allowed to store them by using document files digitizing the documents as well as paper documents. Accordingly, the paper documents have been vigorously scanned and digitized more than before.

Capability of searching for a scanned document image becomes a problem. For example, in order to avoid a duplication of the same file name, there are many cases in which a filename is given to the scanned document image based on a date and a time when the a document is scanned. For example, "20090630141527.jpg" or the like may be applied as the file name. In a case of applying the file name in this manner, since information applied as the file name seems to be a symbol for a user, if the user attempts to find a document image previously scanned, the user is required to search for a desired document image by opening image files one by one. It can be thought to search for the desired document image from roughly outlined images using a reduced image which is a so-called thumbnail. However, it is difficult to find the desired document image from reduced images in a database if the database stores a large amount of forms being in the same format.

Thus, a technology using a so-called OCR (Optical Character Recognition) is proposed in that a character string included in a scanned image is recognized, and a unique file name is applied by using a recognized character string. In general, a file name attempted to be applied in the scanned document image is mostly included in the scanned document image. For example, a title of a document corresponds to the file name attempted to be applied.

Japanese Laid-open Patent No. 9-134406 discloses that a plurality of areas where character strings exist are detected from an image and a likelihood of the character string being a title is calculated based on characteristics of each detected area, and the OCR is performed in an area having the highest likelihood of being the title, so that a preferred file name is acquired from the image. By using this technology, the file name of the scanned document can be used as the title of the document. As a result, it is possible for a user to search for a desired document image file by simply looking at file names. Accordingly, it is possible to greatly reduce a search time of opening document image files one by one.

On the other hand, even if the technology disclosed in the Japanese Laid-open Patent No. 9-134406 is utilized, in a case in which multiple forms of the same format are scanned, plural duplicate file names are created. As a result, capability of search is degraded. Thus, Japanese Laid-open Patent Application No. 2009-27648 discloses a technology to extract multiple character strings from image data and create a file name by chaining the multiple character strings. Moreover, Japanese Laid-open Patent Application No. 2008-77454 discloses a technology in which a title is extracted and recognized, and neighboring character strings are further retrieved if a recognition result matches a predetermined title (for example, a frequently appearing word such as a word "form" or the like). Instead of simply applying a "form" as a file name, this technology realizes applying a file name such as a "form NO: 12457824N".

However, the above-describe technologies cannot detect a title at high accuracy (accuracy near 100%). In addition, accuracy of the character recognition is not 100%. As a result, with such as an unidentifiable garbled character, an abnormal operation can occur more than a few times. When the abnormal operation occurs, since the above-described technologies are too complicated, most users, who do not understand an operation scheme, recognize the technologies as incomprehensible functions, that is, as useless functions. The above-described function applying a file name (hereinafter, called a "fully automatic file naming function") has the above problems.

On the other hand, a technology is proposed to extract and recognize a title as a file name to apply in another approach. For example, Japanese Laid-open Patent Application No. 1-150974 discloses that a title area, where a predetermined marking is detected, is scanned, the OCR is performed on a scanned area, and a character recognition result of the scanned area is applied as a file name to a document image file. Japanese Laid-open Patent Application No. 9-274643 also discloses a similar technology. Hereinafter, these file naming functions are called semi-automatic naming functions.

Advantageously, the above-described semi-automatic naming functions can improve detection accuracy of a title. However, there are problems where an image is tainted due to the marking or a part of a character desired to be recognized is hidden, and accuracy of the character recognition is degraded.

SUMMARY OF THE INVENTION

The present invention solves or reduces one or more of the above problems.

In an aspect of this disclosure, there is provided an image processing apparatus, including a marking position detection part configured to detect a marking position with respect to a first sheet based on first image data scanned from the first sheet; and a first character recognition part configured to conduct first character recognition with respect to an area specified based on the marking position, for second image data scanned from a second sheet.

In the image processing apparatus, it is possible to indicate an area of character recognition without degrading a condition of a document subject to the character recognition.

In other aspects of this disclosure, there may be provided an image processing system, an image processing method, and a computer-readable recording medium thereof, so that the area of the character recognition can be indicated without degrading the condition of a document subject to the character recognition.

BRIEF DESCRIPTION OF THE DRAWINGS

In the following, embodiments of the present invention will be described with reference to the accompanying drawings.

FIG. 2 is a diagram illustrating a procedure for scanning a form and creating a document file by using the image forming apparatus according to the first embodiment;

FIG. 4 is an enlarged diagram illustrating an operation part in FIG. 1, according to the first embodiment;

FIG. 9A and FIG. 9B are diagrams illustrating a process of a labeling part in FIG. 8;

FIG. 10A and FIG. 10B are diagrams illustrating a process of a line space detection part in FIG. 5;

FIG. 11 is a diagram illustrating a process of a character space detection part in FIG. 5;

FIG. 15 is a flowchart for explaining an image process according to the third embodiment;

FIG. 17A and FIG. 17B are diagrams illustrating a form and a marking sheet used in a fifth embodiment;

FIG. 19A and FIG. 19B are diagrams illustrating a form and a marking sheet used in a seventh embodiment;

FIG. 26 is a diagram illustrating a configuration example of a user management table;

FIG. 28 is a diagram illustrating an example of widget information of the print widget for the marking sheet;

FIG. 31 is a diagram illustrating a configuration example of the widget information of the print widget for the marking sheet which is sent from the widget manager to a provider application;

FIG. 35 is a diagram illustrating a configuration example of the widget information of the scan widget for the form; and FIG. 36 is a sequence diagram for explaining a process when the scan widget for the form is executed.

DESCRIPTION OF THE PREFERRED EMBODIMENTS

In the following, embodiments of the present invention will be described with reference to the accompanying drawings.

First Embodiment

<Configuration of Image Forming Apparatus>

Figure 1:
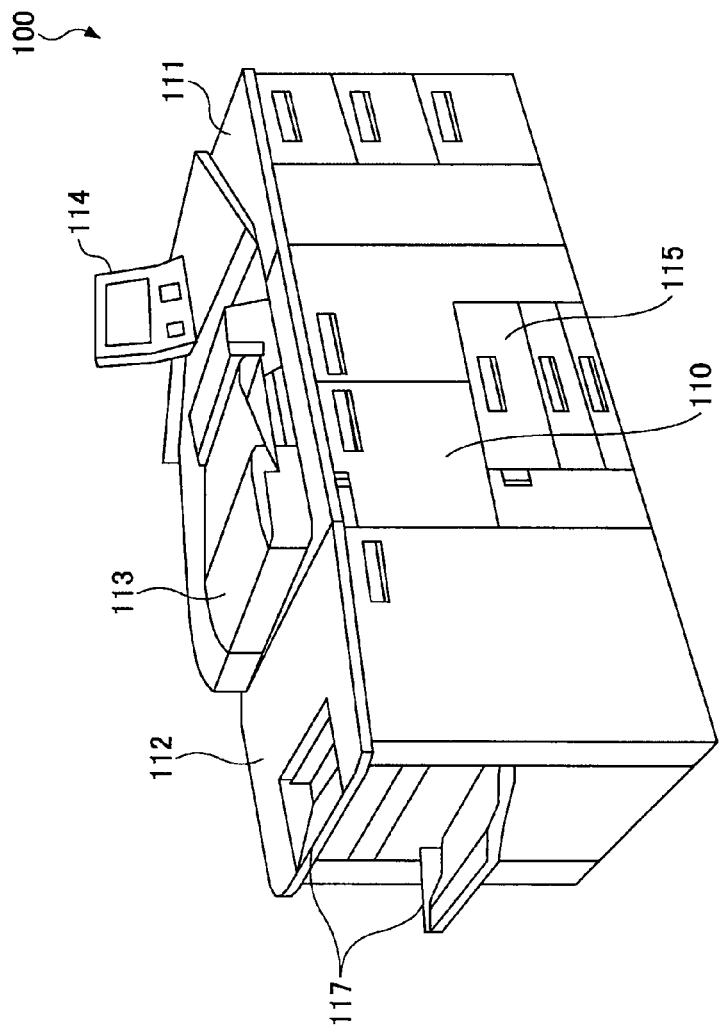
FIG. 1 is a perspective view illustrating an appearance of an image forming apparatus according to a first embodiment.

FIG. 1 is a perspective view illustrating an appearance of a digital multi-functional apparatus (MFP: Multi-Function Peripheral) being an image forming apparatus according to a first embodiment of the present invention. The digital multi-functional apparatus 100 (hereinafter, simply called a "multi-functional apparatus 100") includes a body 110, a Large Capacity Tray (LCT) 111, a finisher 112 for conducting post-processes such as sorting, punching, a stapling, and the like. At an upper part, the body 110 includes an Auto Document Feeder (ADF) 113 for feeding an original placed on a tray to a read position, and an operation part 114 as an interface to an operator for accepting a read mode, a setting of a copy scale, a setting of a paper feed tray, and a setting of the post-process, and for displaying information for the operator. At a lower part, the body 110 includes a paper feeding part 115. The finisher 112 includes an ejecting part 117.

The multi-functional apparatus 100 internally contains a mechanism which constitutes a scanning exposure system, a feed conveyance system, a developing system, a fixing system, a delivery system, and the like, and a control device, which a well-known digital copier for forming an image by an electrophotographic process basically includes, except for a power supply system which will be described later. Also, the multi-functional apparatus 100 conducts a copy operation as follows. That is, the original is placed on the tray of the ADF 113, and when a start button 1142 (refer to FIG. 4) of the operation part 114 is pressed, the original is fed by the ADF 113 and supplied on a contact glass (not shown) being the read position. After that, an image on a surface of the original is transmitted to an acceptance surface of a CCD (Charge Coupled Device) line sensor by a light system and an imaging optical system which are not shown, and is photoelectrically scanned by a two dimensional scan method. Scanned image data are generated as image data for a print (image formation) through various corrections and processes. Laser diodes (LD) of the scanning exposure system are driven based on the generated image data. Beams from the laser diodes scan and expose a surface of a photosensitive drum in two dimensions and an electrostatic latent image is formed. After that, a toner image formed on the electrostatic latent image is fixed on a transfer paper indicated by the operation part 114 as a visible image, through specific processes of toner development, transfer, and fixation which are specific to the electrophotography, so that a copy image is formed. Also, if the post-process is indicated, after the sorting, the punching, the stapling, or the like are performed by the finisher 112, the transfer paper is ejected from the ejecting part 117.

<Character Recognition of Form>

Next, a procedure for creating a document file by a user scanning a form by using the multi-functional apparatus 100 will be described with reference to FIG. 2.

Figure 3B:
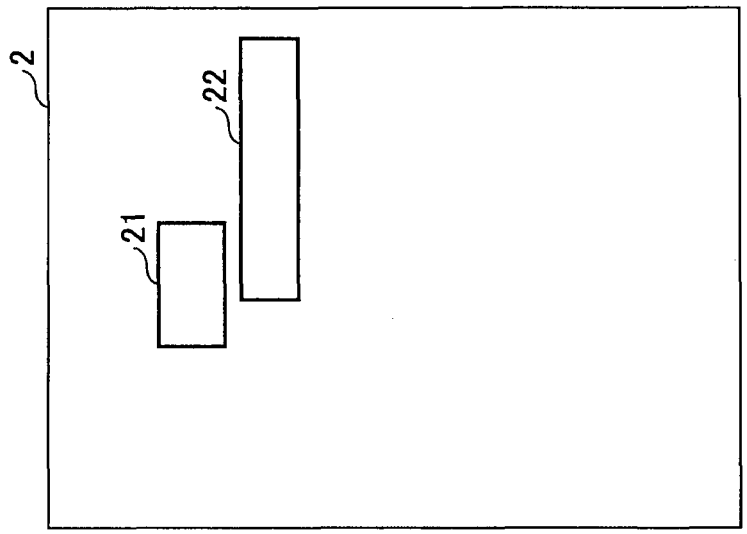
FIG. 3A and FIG. 3B are diagrams illustrating the form and a marking sheet used in the first embodiment.

First, the user prepares an image desired to be scanned (step S1). For example, the user prepares a form 1 illustrated in FIG. 3A. Subsequently, a user overlaps a marking sheet with the image desired to be scanned, and performs a marking by circling an area desired to be a symbolic name of the image with a ball pen or the like (step S2). As an example, a blank print sheet may be used as the marking sheet. By this operation, as illustrated in FIG. 3B, on a marking sheet 2, markings 21 and 22 are applied by corresponding to a character 11 showing "FORM" of the form 1 and a character 12 showing "NO.B1112745N" being a form number. Hereinafter, an image applied to the marking sheet 2 is called a marking image, and an image (form in this example) desired to be scanned as a subject to be stored is called a form image. The symbolic name of the image is a symbolic name which is associated with or given to the image when the image is permanently stored. In this embodiment, the symbolic name of the image is used as a file name, since as a storage part of the image, a well-know file system is generally used. It should be noted that a detailed aspect of the symbolic name may be suitable for a storage part actually used as a destination for storing the image.

Subsequently, the user sets the original on the ADF 113 as the marking sheet 2 is overlapped with the form 1 (step S3). Next, the user sets a mode to set a marked area as the file name (step S4). FIG. 4 is an enlarged diagram illustrating the operation part 114 in FIG. 1. The step S4 is achieved by pressing a button "APPLICATION 1" from mode selection buttons 1141.

Subsequently, when the user presses the start button 1142 of the operation part 114 (step S5), the multi-functional apparatus 100 reads out the marking image from the marking sheet 2, and reads out the form image from the form 1. The multi-functional apparatus 100 further conducts the character recognition with respect to an area corresponding to the marking image in the form image. The multi-functional apparatus 100 displays a character string as a result of the character recognition to have a user confirm the result (step S6). After that, for example, when the user inputs a store instruction, the form image is stored with the character string resulting from the character recognition as the file name.

<Image Process Inside Multi-Functional Apparatus>

Figure 5:
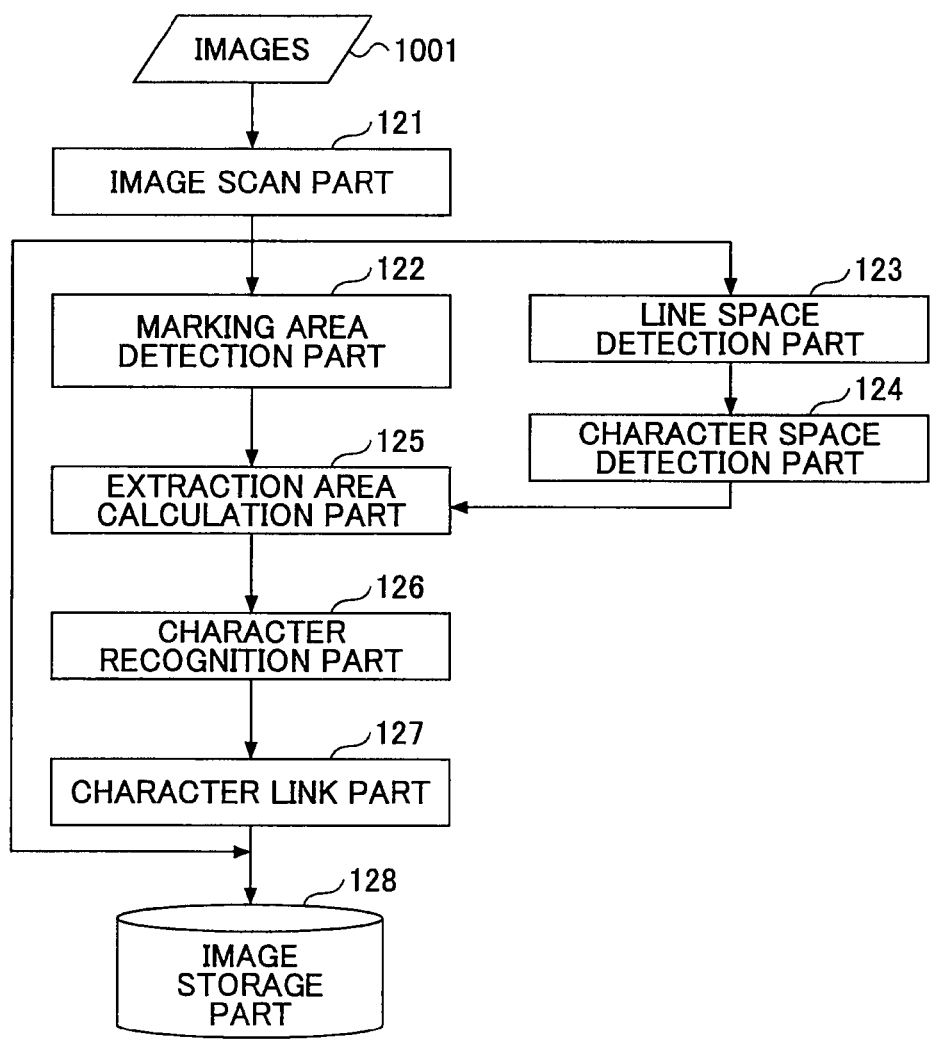
FIG. 5 is a flowchart for explaining an image process in the image forming apparatus according to the first embodiment.

Next, a process flow inside the multi-functional apparatus 100 will be described with reference to FIG. 5. The multi-functional apparatus 100 includes a CPU (Central Processing Unit), a ROM (Read Only Memory), a RAM (Random Access Memory), an HDD (Hard Disk Drive), and the like. This process flow is conducted by executing programs stored in the ROM and the HDD; process parts are illustrated as blocks corresponding to functions of the process flow.

First, a photoelectric transfer is conducted to images 1001 (the marking image and the form image) by an image scan part 121, and the images 1001 are converted into image data. Subsequently, a marking area detection part 122 detects a portion (that is, marked contents) where the user performed the marking. If there are a plurality of markings, all of the markings are detected. After that, the marking area detection part 122 outputs coordinate information of a bounding rectangle portion where the user performed the markings, that is, a horizontal position x, a vertical position y, a width w, and a height h, as the marking area. If there are a plurality of marking areas, the coordinate information of the rectangles are sequentially output in an order of smaller vertical positions and smaller horizontal positions. A detailed operation of the marking area detection part 122 will be described.

Figure 6:
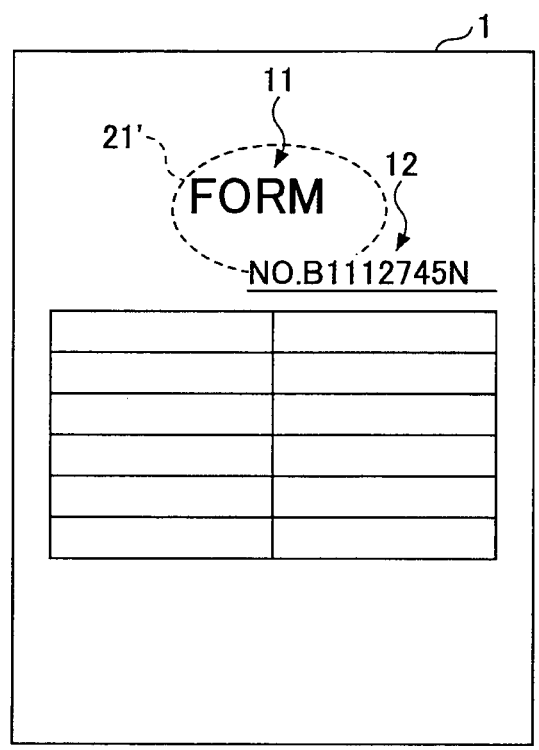
FIG. 6 is a diagram illustrating a case example where a marking area is wider.

In the form image, the character recognition may be conducted for the marking area without a correction. However, as illustrated in FIG. 6, in a case where a portion 21' where the user performed the marking covers another line, an area (a part of a character 12 of "NO.01112745N" in FIG. 6) other than a character string (a character 11 of "FORM" in FIG. 6) indicated by the user causes noise. There are problems of an occurrence of recognizing the noise as a character or the like.

Accordingly, in the first embodiment, instead of using the portion where the user performed the marking for the character recognition without the correction, feature information of the form image is detected (extracted), and the marking area is corrected based on the feature information. In detail, a line space detection part 123 detects line space information as an example of the feature information. Moreover, a character space detection part 124 detects character space information as an example of the feature information. An extraction area calculation part 125 corrects the marking area depending on the detected line space information and the detected character space information. Similar to information acquired as the marking information, the coordinate information of the bounding rectangle, that is, the horizontal position x, the vertical position y, the width w, and the height h are acquired by the correction. This process is conducted for all detected marking areas. Detailed operations of the line space detection part 123, the character space detection part 124, and the extraction area calculation part 125 will be described later.

Subsequently, a character recognition part 126 conducts the character recognition with respect to the form image regarding the corrected marking area, and converts the image data into a predetermined character code (for example, ASCII code). This character recognition process is also conducted for all detected marking areas.

Next, a character link part 127 links character codes output from the character recognition part 126 in an order of ending the character recognition process, applies a page number, an extension (for example, jpg) indicating an image format and the like, and outputs a linked character string. For example, in a case where the marking image and the form image as illustrated in FIG. 3 are prepared, "FORM NO.B1112745N_01.jpg" is output as the linked character string. This character recognition process can be easily conducted by using a well-known technology such as so-called pattern matching or the like, and a detailed explanation will be omitted.

The image storage part 128 stores form image data being read out, with an output character string as the file name. The marking image data are not required after the marking areas 21 and 22 are read out. If the marking image data are stored together with the form image data, the marking image data become noise and retrievability of the file name becomes degraded. Thus, in the first embodiment, the marking image data are stored in another folder separately from the form image data, or the marking image data are discarded. By this operation, the retrievability of the form image data can be improved, and convenience of the user can be improved.

As described above, since the file name is created by using the character string included in the form image, if an area is properly selected by the user, an adequate and unique name can be applied to the form image data. As a result, it is possible to specify an image by the file name alone, and search usability can be considerably improved.

Moreover, as described in the first embodiment, by this configuration having the user perform the marking, there is no problem of the full automatic file naming function, in which a different area, which the user does not intend, is used for the title and applied for the file name.

Furthermore, by separately preparing the marking sheet 2, there is no problem of the above-described conventional semi-automatic naming function in which the original (form 1 in this embodiment) is tainted. In addition, an area to be read out is not hidden by the marking.

Furthermore, by reusing the marking image for the forms having the same format, it is possible to reduce the workload of the marking to a minimum. Also, considering a large number of forms having the same format, if the user prepares a special paper for the marking for each different format of the forms, the user is not required to perform the markings for the same format many times, and the paper is not unnecessarily wasted. In this explanation, the paper is exemplified as the special sheet for the marking. Instead, by using an OHP (Over Head Projector) sheet as the marking sheet, visibility can be improved due to high transmittance when the form is overlaid with the OHP sheet. Also, since the OHP sheet has longer durability than the paper, usability is higher so that the user can repeatedly use the OHP sheet.

When the form is scanned, two images are overlaid with each other. There are advantages of using the OHP sheet as follows. Since the marking sheet is transparent, the user can intuitively predict a subsequent operation of the multi-functional apparatus 100. In addition, if the user uses a wrong marking sheet of a different format of the form, the user easily recognizes his/her mistake.

Furthermore, multiple sheets of forms 1 applying the same marking sheet 2 may be processed at once. Also, the marking sheet 2 to be applied may be used to process multiple different types of the forms 1 at once.

Figure 7:
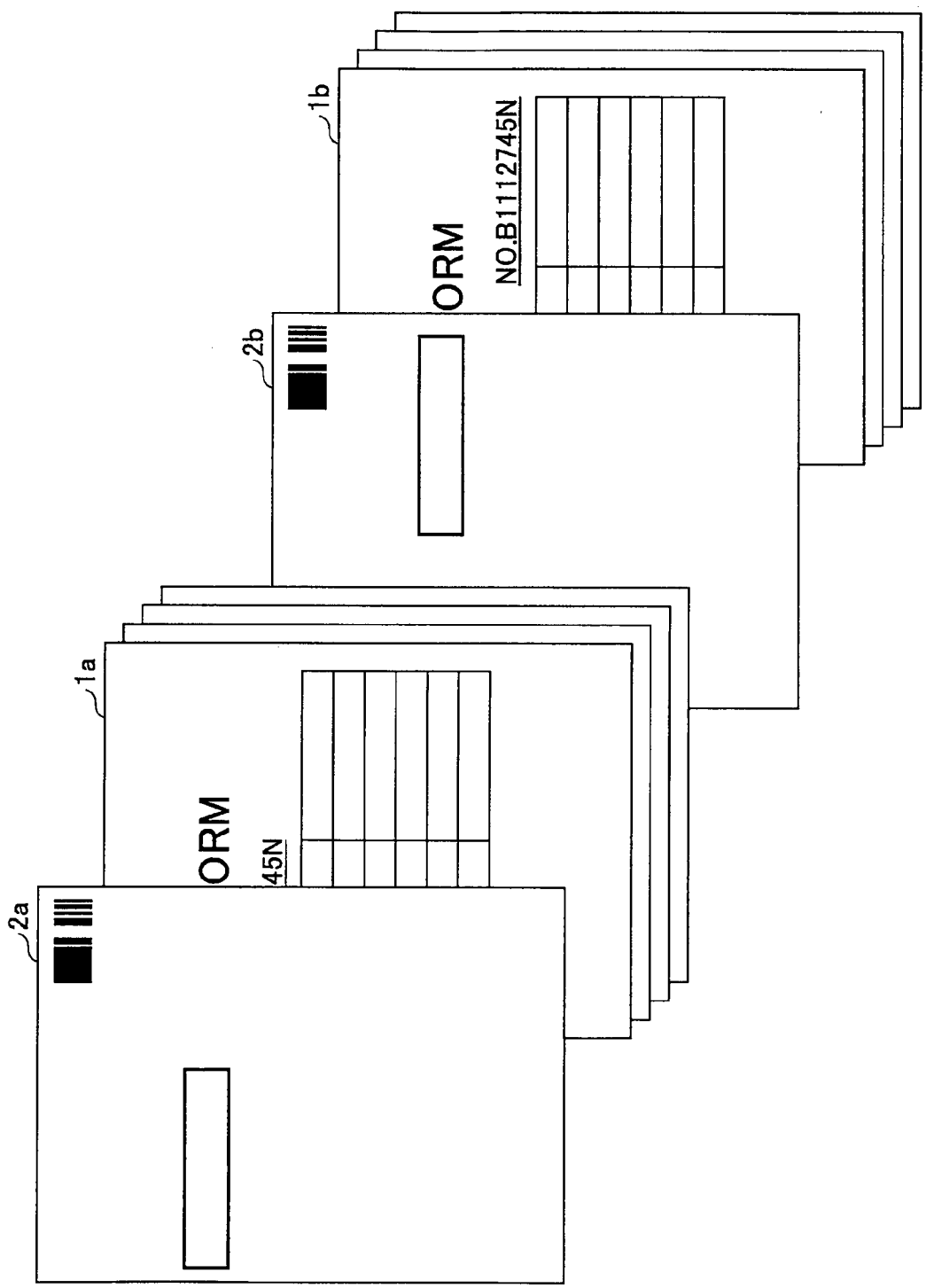
FIG. 7 is a diagram illustrating an example for processing multiple sheets of forms or multiple types of the forms.

FIG. 7 is a diagram illustrating a process of the multiple sheets of forms or the multiple different types of the forms. In FIG. 7, two types of forms 1*a* and 1*b* are illustrated. Regarding each of the forms 1*a* and 1*b*, there are multiple sheets. In this case, as illustrated in FIG. 7, respective marking sheets 2*a* and 2*b* are arranged (overlaid) in front of a top page of the multiple sheets of the form 1*a* and a top page of the multiple sheet of the form 1*b*, and then are placed at the ADF 113 of the multi-functional apparatus 100. In an example in FIG. 7, the marking sheet 2*a* is put on the top page of the form 1*a* and the marking sheet 2*b* is put on the top page of the form 1*b*. Accordingly, the marking sheet 2*b* is placed between a last page of the form 1*a* and the top page of the form 1*b*.

In a case where the marking sheet 2 and the form 1 are set at the ADF 113 as illustrated in FIG. 7, the image scan part 121 converts them into the marking image data and the form image data sequentially from a first page of sheets set at the ADF 113. As a result, in the example in FIG. 7, one set of marking image data scanned from the marking sheet 2*a*, a plurality of sets of form image data scanned from the pages of the form 1*a*, one set of marking image data scanned from the marking sheet 2*b*, and a plurality of sets of form image data scanned from each page of the form 1*b* are generated. Also, an arrangement order of each set of image data is recorded in an order of being scanned.

The marking area detection part 122, the line space detection part 123, the character space detection part 124, and the extraction area calculation part 125 conduct the above-described respective processes with respect to the marking image data. Accordingly, in the example in FIG. 7, these processes are conducted for each set of the marking image data read from the marking sheet 2*a* and the marking sheet 2*b*. A predetermined symbol, figure, or the like may be additionally applied as identification information at a predetermined position of the marking sheet 2. In FIG. 7, an example is illustrated in which a barcode is applied at an upper right of the marking sheet 2. The marking area detection part 122 distinguishes between the marking image data and the form image data, based on a presence or an absence of the identification information.

Subsequently, in accordance with the arrangement order of the image data, the character recognition part 126 conducts the character recognition with respect to the form image data in the marking area which is prior to the form image data subject to be processed and is detected from the latest marking image data.

As described above, each set of the form image data is stored by the file name depending on the marking area which is indicated by the marking sheet 2 corresponding to the form 1.

<Marking Area Detection Part 122>

Figure 8:
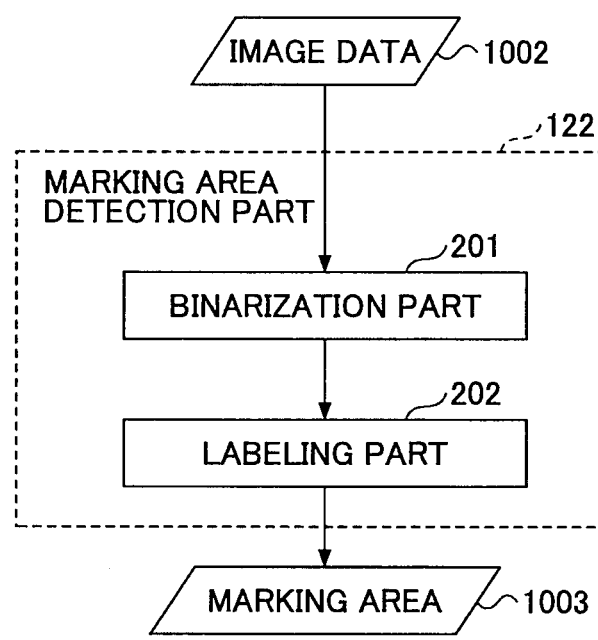
FIG. 8 is a diagram illustrating a configuration of a marking area detection part in FIG. 5.

An operation of the marking area detection part 122 will be described with reference to FIG. 8. As illustrated in FIG. 8, the marking area detection part 122 includes a binarization part 201, a labeling part 202, and the like.

The binarization part 201 determines whether or not each of pixels included in the image is a black pixel or a white pixel by conducting a threshold process with respect to image data (marking image data) 1002. It is assumed that the image data have 8 bits (0 to 255) per pixel; the greater a value of the pixel the brighter the pixel.

The labeling part 202 classifies conductive pixels as one label, and detects a marking area 1003. For example, in a case of a digitized image as illustrated in FIG. 9A, if a label is set as 0 for a background, a labeling process is conducted as illustrated in FIG. 9B so that a label is set as 1 for one black cluster at an upper left and a label is set as 2 for another black cluster at a lower right.

In the following, a detailed labeling method will be described. Pixels of the image are scanned from an upper left corner and a black pixel is searched for. If a current processing pixel is a white pixel, the label is set as 0 for the current processing pixel. On the other hand, if a black pixel is detected, the labeling part 202 checks whether or not an adjacent black pixel is present at a left side or at an upper side of the detected black pixel. If there is the adjacent black pixel, the labeling part 202 sets the same label for the current processing pixel and the adjacent black pixel. If there is no adjacent black pixel, a new label is applied for the current processing pixel. In the same manner, this process is continued until reaching a pixel at a lower right corner of the image. When the label is applied to all pixels, the bounding rectangle is calculated for each label. Referring to the example in FIG. 9B, labels "1" exist at third pixels and fourth pixels from a left side in second pixels and third pixels from an upper side. The bounding rectangle is calculated as a rectangle of left=3, upper=2, width=2, and height=2.

If an area smaller than a predetermined size is ignored after the labeling process, it becomes a stronger system against a noise. Also, after noise elimination, if the number of labeled elements is zero, the user is informed through a display 1143 of the operation part 114 that reading the marking area is not normally conducted.

<Line Space Detection Part 123>

As previously described, the line space detection part 123 detects a line space for a correction of the marking area. For the entire image, similar to the binarization part 201, the line space detection part 123 determines whether or not each of pixels is black (0) or white (255). After that, the line space detection part 123 integrates pixel values by scanning in a horizontal direction for each coordinate of a vertical direction. For example, if this process is conducted for the image data of the image as illustrated in FIG. 10B, a histogram can be acquired as illustrated in FIG. 10A. In this image, since the line space is pure white, an integrated value in the horizontal direction becomes remarkably high. On the other hand, if a character exists, the integrated value in the horizontal direction is slightly lower. As a result, a peak is shown corresponding to the line space in the histogram. The line space detection part 123 detects all peaks and outputs line space coordinates.

<Character Space Detection Part 124>

The character space detection part 124 is intended to correct the marking area, similar to the line space detection part 123, so as to detect a character space. The character space detection part 124 detects the character space for each line. The line is an area between lines detected by the line space detection part 123.

The character space detection part 124 digitizes the image, similar to the line space detection part 123. At this stage, for each coordinate of the vertical direction, the character space detection part 124 integrates pixel values by scanning in the vertical direction and creates the histogram. As the same as detected the line space, the histogram becomes significantly high and shows a peak at a position between characters. The character space detection part 124 detects all peaks, and outputs data as character space coordinates. The character space coordinates are calculated for each line. In FIG. 11, the line spaces and the character spaces are illustrated by black regions.

<Extraction Area Calculation Part 125>

As previously described, the extraction area calculation part 125 modifies the area where the user actually performed the marking, by using line space information and character space information. First, a modification is performed by using the line space information. In a case of including two line spaces, that is, only one line in the marking area, the extraction area calculation part 125 determines an upper edge and a lower edge of the one line as those edges of the marking area after the modification. In a case of including multiple lines, the extraction area calculation part 125 informs the user through the display 1143 of the operation part 114 that an extraction of the marking area has failed. Also, in a case where only one line space is included in the marking area, that is, in a case where one line is incompletely included in the marking area, the extraction area calculation part 125 checks in the vicinity of the upper edge and the lower edge of the marking area, and searches for the closest line space. Then, the extraction area calculation part 125 determines a closer line space and the line space included in the marking area at the upper edge and the lower edge of the marking area after the modification.

Next, the extraction area calculation part 125 checks a right side and a left side of the marking area by using the character space information, and sets the closest character space positions as the right side and the left side of the marking area after the modification. Subsequently, the extraction area calculation part 125 checks the number of characters included in the marking area. If the number of characters is zero, it is determined that there is no character to detect, and this determination is reported to the user through the display 1143.

As described above, by conducting the correction, even if the marking is improperly performed by the user as illustrated in FIG. 6, it is possible to reduce the likelihood of missing a character string image to be recognized and of improperly conducting the character recognition for an unnecessary image. As a result, it is possible to improve the likelihood of acquiring a recognition result as the user expected. Also, since this embodiment allows that a portion other than the area to be read out can be included, the user can readily perform the marking.

In the above, a frame of a rectangle or oval shape is applied for the marking area. Alternatively, the marking area can be indicated by parentheses such as [ ], < >, and the like, or by an underline or the like. Even if these signs are used, by defining a relationship between the signs and a character recognition area of the form image beforehand, it is possible to detect the marking area and conduct the character recognition, similar to the frame.

Second Embodiment

Figure 12A:
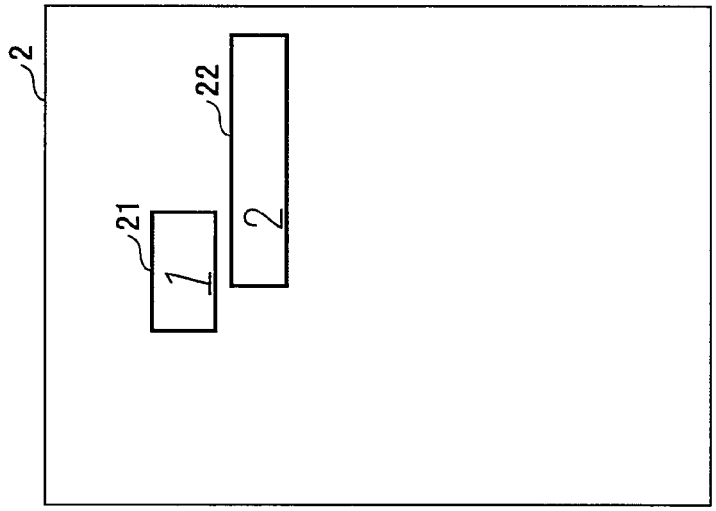
FIG. 12A and FIG. 12B are diagrams illustrating a form and a marking sheet used in a second embodiment.
Figure 12B:
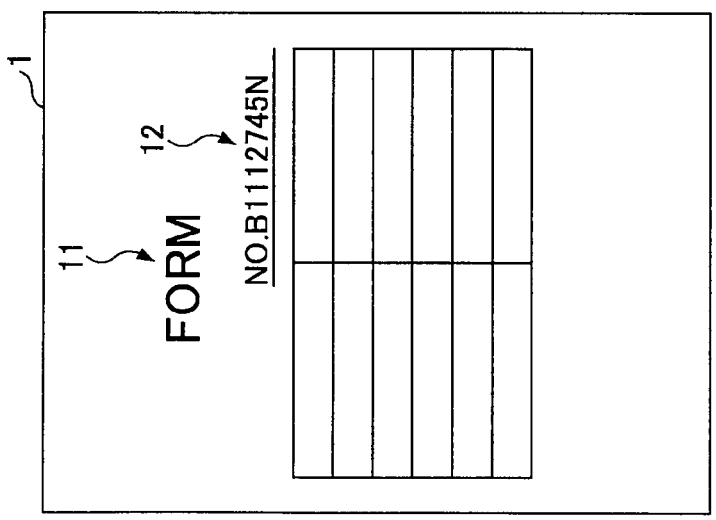
Figure 13:
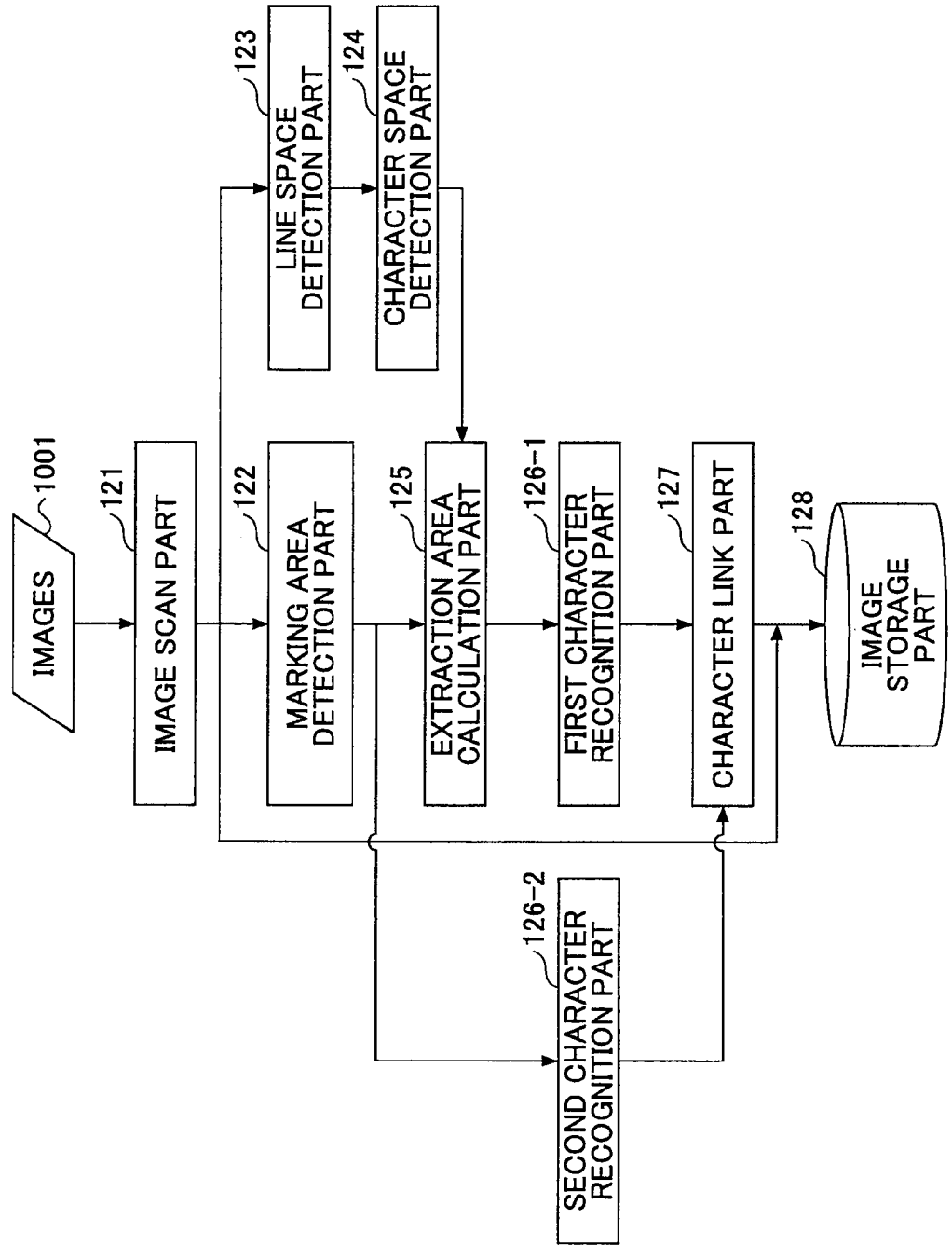
FIG. 13 is a flowchart for explaining an image process according to the second embodiment.

FIG. 12A and FIG. 12B are diagrams illustrating a form and a marking sheet used for a multi-functional apparatus which is an image forming apparatus according to a second embodiment of the present invention. Also, FIG. 13 is a flowchart for explaining an image process inside the multi-functional apparatus according to the second embodiment. The second embodiment is approximately the same as the first embodiment. Different from the first embodiment, in the second embodiment, the character recognition is conducted for not only the form image but also the marking image.

Figure 3A:
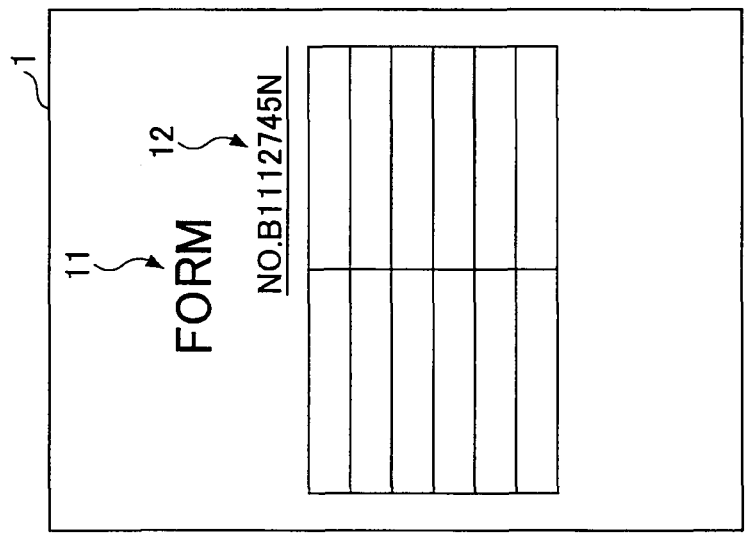

As illustrated in FIG. 12A, the form image in the second embodiment is similar to that in the first embodiment (FIG. 3A). However, different from the marking image in FIG. 3B in the first embodiment, as illustrated in FIG. 12B, in the second embodiment, numerals "1" and "2" are written in marking areas 21 and 22. These numerals "1" and "2" are manually written by the user.

In a case where a plurality of marking areas 21 and 22 exist, it is required to link character strings to form the file name. In the first embodiment, a sequence for linking character strings is determined depending on detected positions of the marking areas. The sequence is not always determined in accordance with a simple rule. An effective way to define an adequate sequence is to be indicated by the user. In the second embodiment, the user is urged to indicate the sequence for linking the character strings in the marking areas 21 and 22.

Moreover, in the multi-functional apparatus 100, as illustrated in FIG. 13, in addition to a first character recognition part 126-1 which conducts an operation the same as that of the character recognition part 126 (FIG. 5) in the first embodiment, a second character recognition part 126-2 for conducting the character recognition inside the marking areas 21 and 22 is provided, so that an output from the second character recognition part 126-2 is supplied to the character link part 127.

In the character recognition process with respect to the marking image data, it is preferred to significantly reduce the number of character types to be recognized more than the character recognition process conducted for the form image. For example, in the second embodiment, it is limited to a numerical character. In general, since a shape of a handwritten character is flexible more than a typed character, the character recognition becomes difficult. Accordingly, as described in the second embodiment, by limiting the character types to be recognized to the numeral characters, a degradation of a recognition rate can be suppressed.

Moreover, in the above, it is described that the "character recognition" is conducted with respect to the marking image. However, it is not necessary to always recognize characters. The numeral character can be intuitively written by the user. Alternatively, by determining a correspondence between easily recognized symbols (◯, Δ, ■, and the like) and the numeral characters beforehand, the same advantages can be acquired, and it can be predicted that the recognition rate will be improved more than a case of using the numeral characters. Accordingly, the second character recognition part 126-2 is not required to be the OCR in the strict sense.

Third Embodiment

Figure 14A:
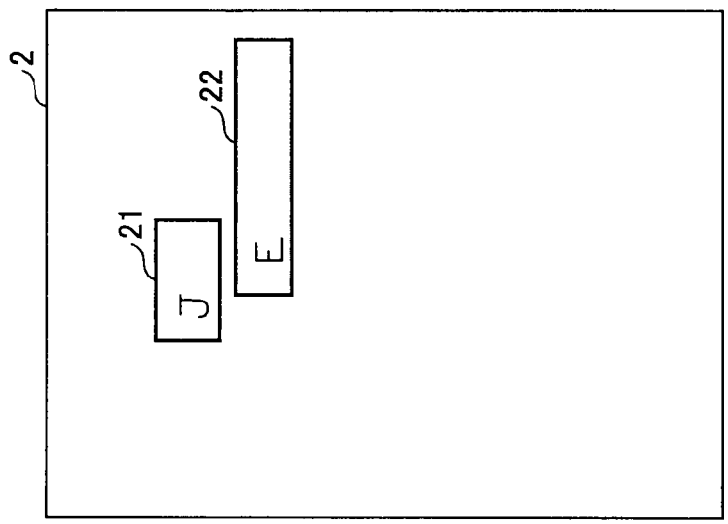
FIG. 14A and FIG. 14B are diagrams illustrating a form and a marking sheet used in a third embodiment.
Figure 14B:
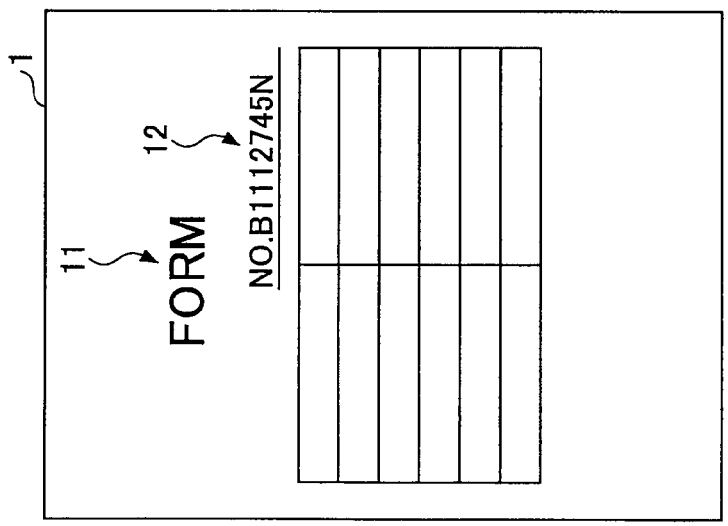

FIG. 14A and FIG. 14B are diagrams illustrating a form and a marking sheet used for a multi-functional apparatus which is an image forming apparatus according to a third embodiment of the present invention. Also, FIG. 15 is a diagram illustrating an image process inside the multi-functional apparatus according to the third embodiment. Similar to the second embodiment, in the third embodiment, the character recognition is conducted for not only the form image but also the marking image.

As illustrated in FIG. 14A, the form image in the third embodiment is the same as that in the first embodiment (FIG. 3A) and the second embodiment (FIG. 12A). On the other hand, as illustrated in FIG. 14B, similar to the second embodiment (FIG. 12B), characters are written in the marking images. However, different from the second embodiment, in the third embodiment, instead of numerals "1" and "2", alphabets "J" and "E" are written.

Moreover, inside the multi-functional apparatus 100, as illustrated in FIG. 15, similar to the second embodiment, in addition to the first character recognition part 126-1 which conducts an operation as the same as that of the character recognition part 126 (FIG. 5) in the first embodiment, the second character recognition part 126-2 for conducting the character recognition inside the marking areas 21 and 22 is provided. However, different from the second embodiment, in the third embodiment, an output from the second character recognition part 126-2 is supplied to the first character recognition part 126-1.

In the first character recognition part 126-1, an operation is changed depending on a recognition result of the second character recognition part 126-2. That is, one character recognition restricted to English is conducted for the marking area 22 where a character "E" is detected, and another character recognition restricted to Japanese is conducted for the marking area 21 where a character "J" is detected.

In general, with respect to a specific language, the character recognition process is provided with an algorithm for extracting the most appropriate area and with the most appropriate library, to improve the recognition rate. On the other hand, if it is assumed that a plurality of languages are input, it is predicted which language is utilized and the character recognition of the predicted language is utilized. Accuracy of this prediction is not 100%. If the prediction of language is wrong, recognition accuracy is degraded. That is, if it is apparent in advance that which language's character recognition is to be used, the recognition accuracy can be improved.

According to the third embodiment, since the user can indicate the character recognition of a desired language by simply writing one character by hand in an area subject to conducting the character recognition, it is possible to easily improve the recognition accuracy. In the third embodiment, English and Japanese can be indicated. Alternatively, further character types may be applied so that a character "N" is assigned for a numerical character and a character "K" is assigned for half size of character (for example, so-called "hankaku kana" in Japanese). In this case, it can be configured so that if the user writes "EN" in the area for the character recognition, a character recognition result is limited to English and numerals.

Fourth Embodiment

Figure 16A:
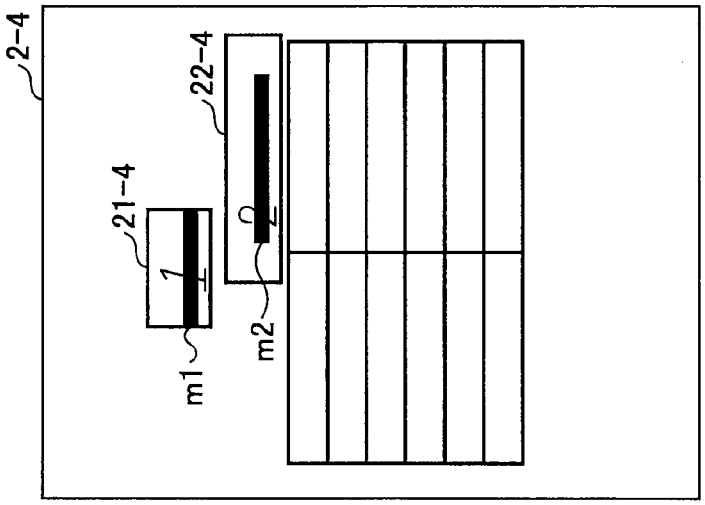
FIG. 16A and FIG. 16B are diagrams illustrating a form and a marking sheet used in a fourth embodiment.
Figure 16B:
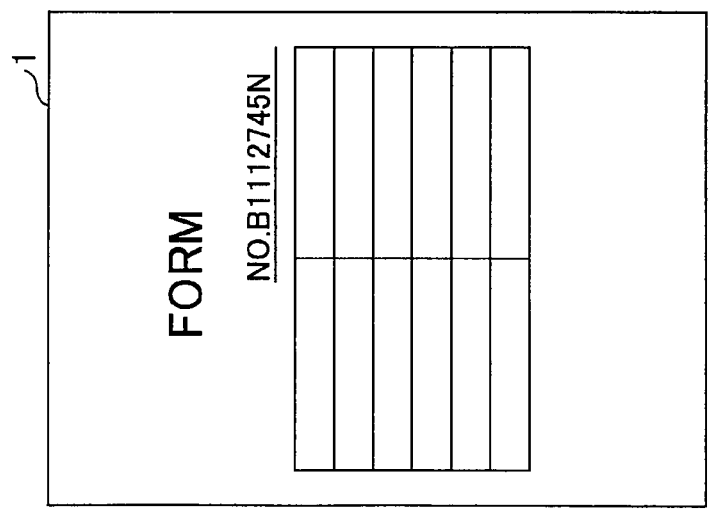

FIG. 16A and FIG. 16B are diagrams illustrating a form and a marking sheet used for a multi-functional apparatus which is an image forming apparatus according to a fourth embodiment of the present invention. As illustrated in FIG. 16A, the form 1 in the fourth embodiment is the same as that in the previously described embodiments. On the other hand, as illustrated in FIG. 16B, for a marking sheet 2-4, images (hereinafter, called a "frame image"), where figures such as rectangles circling each character string and ruled lines of a blank form image (that is, an image of template of the form 1) are drawn, are recorded beforehand. That is, in the fourth embodiment, by analyzing a template image of the form 1 (form template image) beforehand, electronic data (hereinafter, called "frame image data") recording the frame image are generated. Then, by printing out the frame image data by a printer, the marking sheet 2-4 is created and output. The frame image data may be manually created by a user, or may be automatically created by a predetermined program. In a case of generating the marking image based on the form template image, a well-know image processing technology may be used to extract the ruled lines or each of rectangles enclosing each character string from the form image.

In the fourth embodiment, with respect to the marking sheet 2-4 where the frame image is recorded, the user performs the marking with a writing tool of color (other than black) such as a highlight pen, a color pencil, or the like in rectangles (including a rectangle inside the ruled lines) to be the marking area. In FIG. 16B, a marking m1 and a marking m2 are illustrated as examples. As illustrated in FIG. 16B, in a case where characters which are subjects for the character recognition are written in the rectangle of the marking, the highlight pen is preferable to use.

Process contents of the multi-functional apparatus 100 according to the fourth embodiment may be the same as those in the first through third embodiments. However, contents of the marking image and an operation of the marking area detection part 122 are different from the second embodiment.

That is, in the fourth embodiment, the marking images generated by the image scan part 121 includes the frame image, in addition to images (for example, the markings m1 and m2) where the marking is performed by the user. Also, instead of digitizing the marking image, the marking area detection part 122 detects a drawing portion (pixels) having colors other than black, and detects a rectangle including the drawing portion as the marking area. As a result, the marking area 21 including marking m1 and the marking area 22 including marking m2 in FIG. 16B are detected. The well-known image processing technology may be used to detect each rectangles.

In FIG. 16B, respective numerals "1" and "2" included in the marking areas 21 and 22 are applied in the same manner as in the second embodiment. Instead of the numeral characters, similar to the third embodiment, alphabetic characters can be applied.

The markings m1 and m2 may not be always color. In a case where the markings m1, m2, and the like are not limited to color, similar to the previously described embodiments, the marking area detection part 122 digitizes the marking image. Subsequently, the marking area detection part 122 extracts a difference between the digitized marking image and the frame image indicated by the frame image data being stored beforehand, so as to detect the markings m1 and m2, and the like. Other processes are the same as the above-described processes, and explanations thereof will be omitted. In a case where the multiple types of forms 1 are processed, the frame image may be different for each type of the forms. Accordingly, in this case, a barcode or the like embedding an identification of a type of the form 1 may be recorded in the marking sheet 2-4 with the frame image corresponding to the type. The marking area detection part 122 extracts difference between the frame image indicated by the frame image data corresponding to the identification read from the barcode and the marking image read from the marking sheet 2-4.

According to the fourth embodiment, since the marking area is detected by a rectangle area unit which is analyzed beforehand, it is possible to specify the marking area at higher accuracy. Also, it is possible to reduce the necessity of the line space detection part 123 and the character space detection part 124, and to further simplify process contents.

Fifth Embodiment

Figure 18:
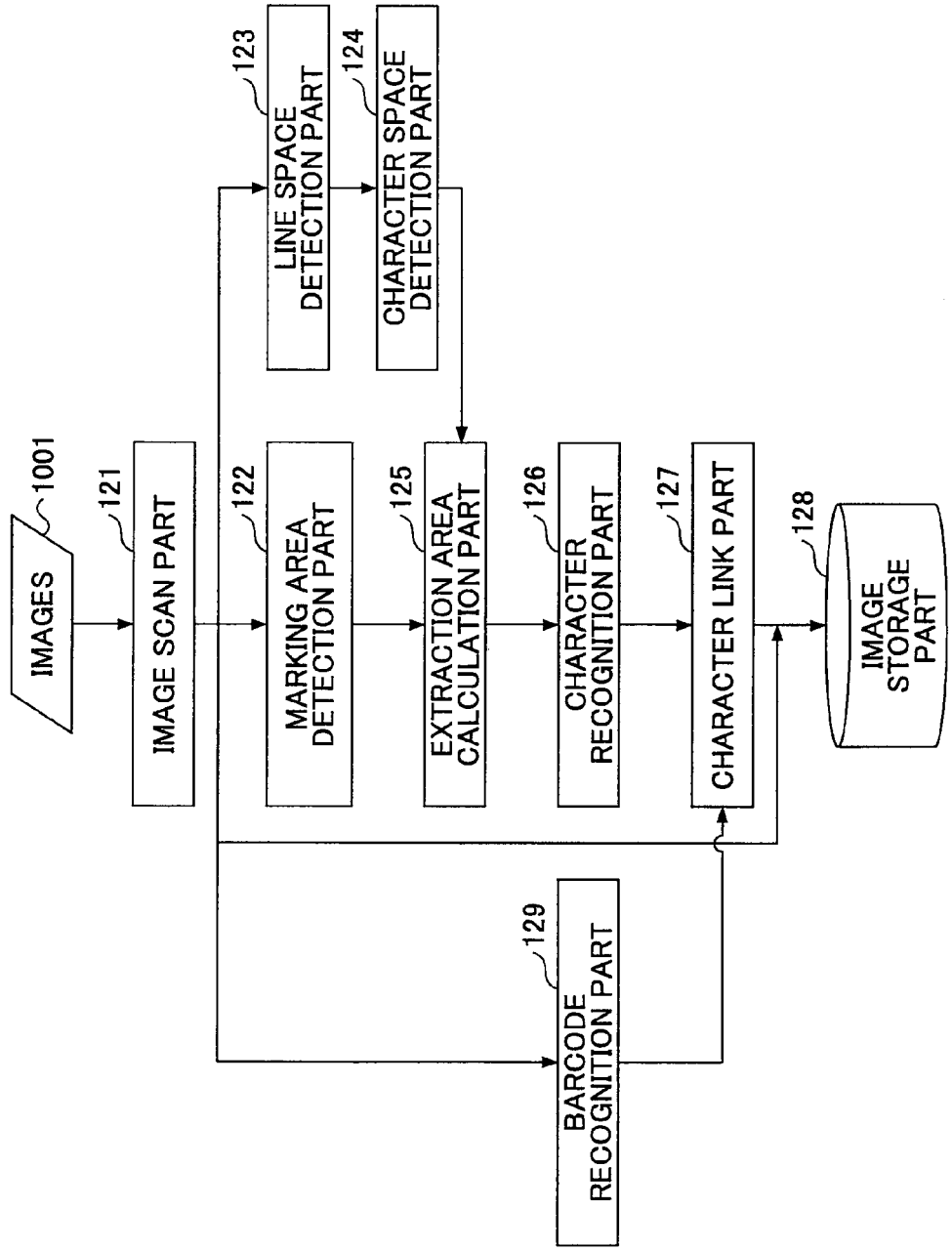
FIG. 18 is a diagram illustrating a modification of the form and the marking sheet used in the fifth embodiment.

FIG. 17A and FIG. 17B are diagrams illustrating a form and a marking sheet used for a multi-functional apparatus which is an image forming apparatus according to a fifth embodiment of the present invention. Also, FIG. 18 is a diagram illustrating an image process inside the multi-functional apparatus according to the fifth embodiment. The fifth embodiment is approximately the same as the first embodiment. Different from the first embodiment, in the fifth embodiment, a barcode is output on a marking sheet 2-5.

As illustrated in FIG. 17A, the form image in the fifth embodiment is the same as that in the first embodiment (FIG. 3A). Regarding the marking image, as illustrated in FIG. 17B, similar to the first embodiment (FIG. 3B), there is the marking area 22 corresponding to the characters 12 showing "NO.B1112745N" being the form number. However, different from the first embodiment (FIG. 3B), in the fifth embodiment, there is no marking area corresponding to the character 11 showing "FORM". Instead, there is a barcode 23. A word indicated by the user is embedded in the barcode 23 and the embedded word is "FORM".

Also, inside the multi-functional apparatus 100, as illustrated in FIG. 18, in addition to the process flow in the first embodiment (FIG. 5), a barcode recognition part 129 is provided, and an output of the barcode recognition part 129 is supplied to the character link part 127.

By this configuration, similar to the first embodiment, the marking area 22 is detected, and the character recognition is conducted with respect to the marking area 22 in the form image data, so that the character string "NO.B1112745N" is acquired. In addition, the barcode 23 is scanned, so that the word "FORM" is recognized. The following processes are the same as those in the first embodiment. The recognized character string and word are linked by the character link part 127. Thus, "FORM NO.B1112745N_01.jpg" is set as the file name.

In a case of scanning the form of the same format many times, a part of a word is known beforehand without the character recognition. For example, the word "FORM" as an example in the fifth embodiment is always described in the form 1 of this format. The character recognition may be conducted for the word "FORM" each time. However, the recognition accuracy of the barcode is remarkably higher than that of the character recognition.

Accordingly, as described in the fifth embodiment, if a paper sheet is utilized on which the barcode embedding a keyword is printed, it is possible to detect the keyword used for the file name at high accuracy every time. By this configuration, since the likelihood of modifying the file name by the user can be reduced, steps for a modification can be reduced when the recognition result is wrong, and usability can be improved. The barcode is used in the fifth embodiment. Alternatively, a two dimensional code may be used, or other codes may be used.

Sixth Embodiment

A form and a marking sheet in the sixth embodiment may be the same as those in the fifth embodiment. An image process inside the multi-functional apparatus 100 may be the same as that in the fifth embodiment. However, in the sixth embodiment, information embedded in the barcode 23 is different from that in the fifth embodiment. In the sixth embodiment, a character string (folder name) indicating a storage location of the form image data is recorded.

Accordingly, in the sixth embodiment, the barcode recognition part 129 extracts the character string from the barcode 23. The character link part 127 additionally provides the character string extracted by the barcode recognition part 129 as the folder name to the linked character string (file name), so as to generate a file path name. As a result, the form image data are stored by the image storage part 128 under a folder of the folder name indicated by the barcode 23.

According to the sixth embodiment, it is possible to properly classify the storage location of the form image data. For example, a marking sheet 2-7 including the barcode 23, where the folder name responsive to the type of the form 1, is created for each type of the form 1. By using the marking sheet 2-5 responsive to the type of the form 1 to be stored, it is possible to store the form image data in a different folder for each type of the form 1.

Since the folder name has a large amount of information, as the barcode 23 to embed the folder name, a two dimensional code such as a QR code can be used. Also, the character string indicating the storage location is not limited to the folder name. For example, a URL (Uniform Resource Locator) or the like may be used as the character string indicating the storage location.

Seventh Embodiment

In the previous embodiments, only the file naming is described. However, the present invention is not limited to the file naming. For example, a character (symbol) read out from the marking image can be associated with text read out from the form image and can be stored as XML (eXtensible Markup Language) data. In this configuration, by preparing an adequate marking image, it is possible to build an application suitable for a form of any format.

FIG. 19A and FIG. 19B are diagrams illustrating a form and a marking sheet used for a multi-functional apparatus which is an image forming apparatus according to a seventh embodiment of the present invention. Also, FIG. 20 is a diagram illustrating an image process inside the multi-functional apparatus according to the seventh embodiment.

As illustrated in FIG. 19A, in the form 1, a form number 13 and a payment 14 of an invoice are written. On the other hand, the marking sheet 2-7, marking areas 24 and 25 are arranged, and numerals "1" and "2" are written respectively in the marking areas 24 and 25.

Figure 20:
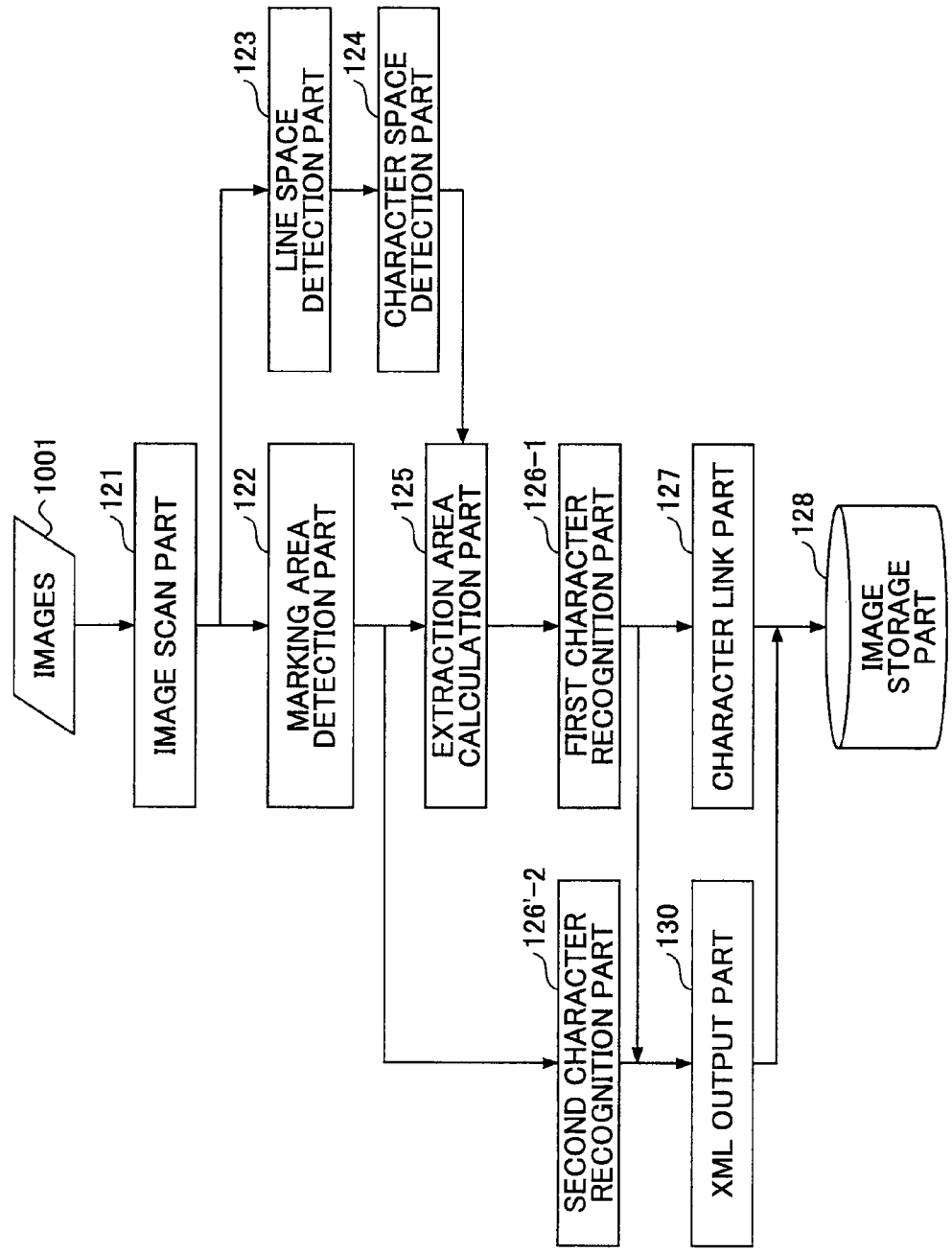
FIG. 20 is a flowchart for explaining an image process according to the seventh embodiment.

Moreover, as a flow of the image process inside the multi-functional apparatus 100, as illustrated in FIG. 20, in addition to the first character recognition part 126-1 conducting an operation the same as that of the character recognition part 126 in the first embodiment (FIG. 5), a second character recognition part 126'-2 and a XML output part 130 are provided. The second character recognition part 126'-2 conducts the character recognition inside the marking areas 24 and 25, and the XML output part 130 outputs data of a XML format by associating the data with outputs of the first character recognition part 126-1 and the second character recognition part 126'-2.

That is, numerals are defined by corresponding to types of areas beforehand, so that a numeral "1" corresponds to an area for the form number and a numeral "2" corresponds to an area for the payment of the invoice. When the user acquires a new form, the user indicates the marking area on the marking sheet, and writes numerals corresponding to types of areas. After that, by simply scanning the new form and the marking sheet being overlaid together, it is possible to install the form having any format into a predetermined database.

In order to realize an operation similar to that in the seventh embodiment, in a conventional manner, it has been required to build a reading rule for each format of forms, and set the reading rule in an application. This operation is complicated for a user unfamiliar with PC (Personal Computer) operations, and depending on the user, the user needs the help of a system engineer. In the seventh embodiment, the user can determine the reading rule for various formats by an intuitive operation. Thus, the usability for the user can be significantly improved.

In the above, various embodiments using the multi-functional apparatus 100 as the digital multi-functional apparatus are explained. The present invention is not limited to the digital multi-functional apparatus. The present invention can be practicable if there are a scanner and a processing unit (processor). For example, as a scanner, a flat bed scanner for personal use may be used. Also, a process such as marking area detection or the like can be realized by using a scanner and a PC connected to the scanner via a network.

Eighth Embodiment

Figure 21:
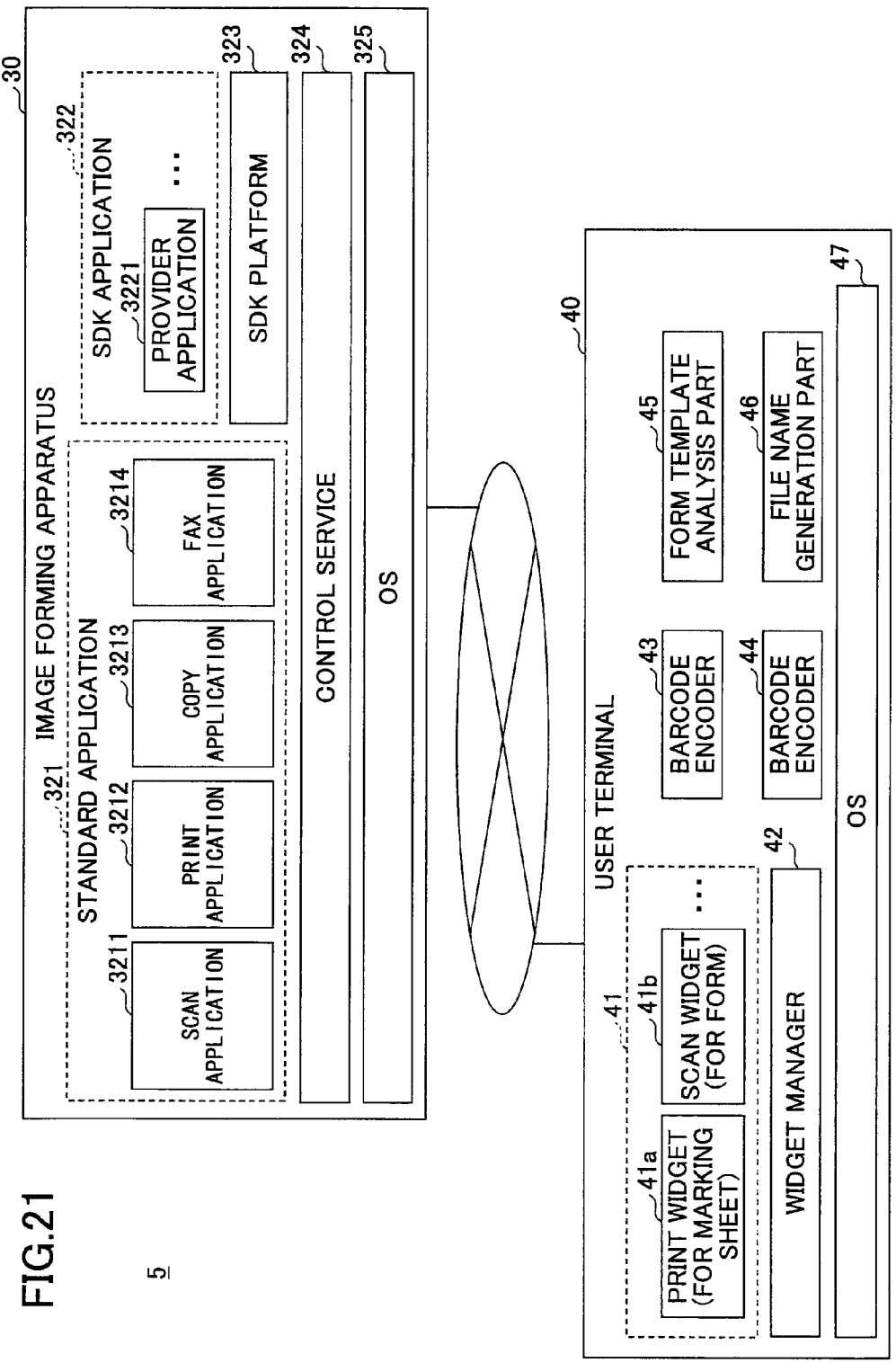
FIG. 21 is a diagram illustrating a configuration example of an information processing system according to an eighth embodiment.

Next, an information processing system using the above-described technology will be described in an eighth embodiment. FIG. 21 is a diagram illustrating a configuration example of an information processing system according to the eighth embodiment. In an information processing system 5 in FIG. 21, at least one image forming apparatus 30 and at least one user terminal 40 are connected through a network (regardless of a wired network and a wireless network) such as a LAN (Local Area Network), the Internet, or the like.

The image forming apparatus 30 is a multi-functional apparatus which realizes functions of a scanner, a printer, a copier, and a facsimile machine in a single housing. In the eighth embodiment, it is preferred that the image forming apparatus 30 includes both a scan function and a print function. However, an apparatus including either one of the scan function and the print function can be applied as the image forming apparatus 30. In this case, the information processing system 5 may include at least one apparatus having the scan function and at least one apparatus having the print function.

The user terminal 40 is a personal terminal used by a user, and can have installed and execute a software program. If a communication function is included, the user terminal 40 is not limited to a specific apparatus. As an example of the user terminal 40, a desktop type PC (Personal Computer), a notebook type PC, a PDA (Personal Digital Assistant), a mobile telephone, or the like can be applied.

A software configuration of the user terminal 40 will be described. In FIG. 21, the user terminal 40 includes a print widget 41a for a marking sheet, a scan widget 41b for a form, a widget manager 42, a barcode encoder 43, a barcode decoder 44, a form template analysis part 45, a file name generation part 46, an OS (Operating System) 47, and the like.

In the eighth embodiment, the print widget 41a for the marking sheet and the scan widget 41b for the form are application programs which are generically called "widgets 41". Recently, a simple application called Widget or Gadget has become widely used. In the eighth embodiment, having a meaning of an application easily installed and convenient to use, these applications are generically called widgets 41 (that is, it is not limited to technical meanings). However, in the eighth embodiment, widgets 41 have a common view of realizing a predetermined process flow (for example, a sequence of a process flow) using functions of the image forming apparatus 30.

The print widget 41a for the marking sheet causes the image forming apparatus 30 to conduct a print job for printing out the marking sheet where a barcode or the like is recorded beforehand as described in the sixth embodiment.

The scan widget 41b for the form causes the image forming apparatus 30 to conduct a scan job regarding the marking sheet and the form. The scan widget 41b for the form stores form image data with a file name, which is generated based on marking image data and form image data scanned by the scan job, in a storage unit of a user terminal 40.

The widget manager 42 intermediates communications between the widgets 41 and the image forming apparatus 30. Each of the widgets 41 is required to include an interface and a process ruled by the widget manager 42. That is, applications operating by cooperating with the widget manager 42 correspond to the widgets 41 in the eighth embodiment.

The barcode encoder 43 accepts a character string as input information, and generates barcode image data indicating the character string. The barcode decoder 44 accepts the barcode image as the input information, and extracts the character string embedded in the barcode image.

The form template analysis part 45 analyzes template data (form template data) of a form, and generates frame image data in which a rectangle circling a character string and ruled lines in a blank form are recorded. The form template data are electronic data in which a format of the blank form is recorded. The form template data may be image data, or document data generated by a predetermined application (software of a word processor, a spreadsheet, or the like). A well-known image processing technology may be used to generate the frame image data from the form template data. As a state in which the user possesses the form template data, it may be assumed that the user fills in and uses a form according to the form template data.

The file name generation part 46 extracts the character string from the form image data based on the marking image data, and extracts the file name corresponding to the form image data based on the extracted character string.

The OS 47 is an OS (Operating System). Software at the user terminal 40 is operated as a process or a thread on the OS 47.

A software configuration of the image forming apparatus 30 will be described. In FIG. 21, the image forming apparatus 30 includes a standard application 321, SDK (Software Development Kit) applications 322, a SDK platform 323, a control service 324, an OS 325, and the like.

The standard application 321 is a set of applications normally implemented (with shipment) in the image forming apparatus 30. In FIG. 21, as application examples, a scan application 3211, a print application 3212, a copy application 3213, and a FAX application 3214 are illustrated. The scan application 3211 executes a scan job. The print application 3212 executes a print job. The copy application 3213 executes a copy job. The FAX application 3214 executes a send job or a receive job of a facsimile.

The control service 324 is a software module group for supplying functions to an upper application or the like to control various hardware resources. For example, the control service 324 includes a function related to network communication, a function to control a scanner, a function to control a printer, a function to manage a memory, and the like.

Each of the SDK applications 322 is an application which is additionally installed as a plug-in to functionally extend the image forming apparatus 30 when the image forming apparatus 30 is shipped. In FIG. 21, as the SDK application 322, a provider application 3221 is illustrated. The provider application 3221 conducts a process for causing the image forming apparatus 30 to operate the widgets 41.

The SDK platform 323 provides an execution environment of the SDK applications 322. Each of the SDK applications 322 is developed by using an API (Application Program Interface) provided by the SDK platform 323. For example, the SDK platform 323 provides an interface to utilize the scan function, an interface to utilize the print function, an interface to utilize the copy function, and the like, to the SDK applications 322. Since the API of the SDK platform 323 is open, the SDK applications 322 can be developed by a third vendor or the like.

The OS 325 is a so-called OS (Operating System). Software of the image forming apparatus 30 is operated as a process or a thread on the OS 325.

Figure 22:
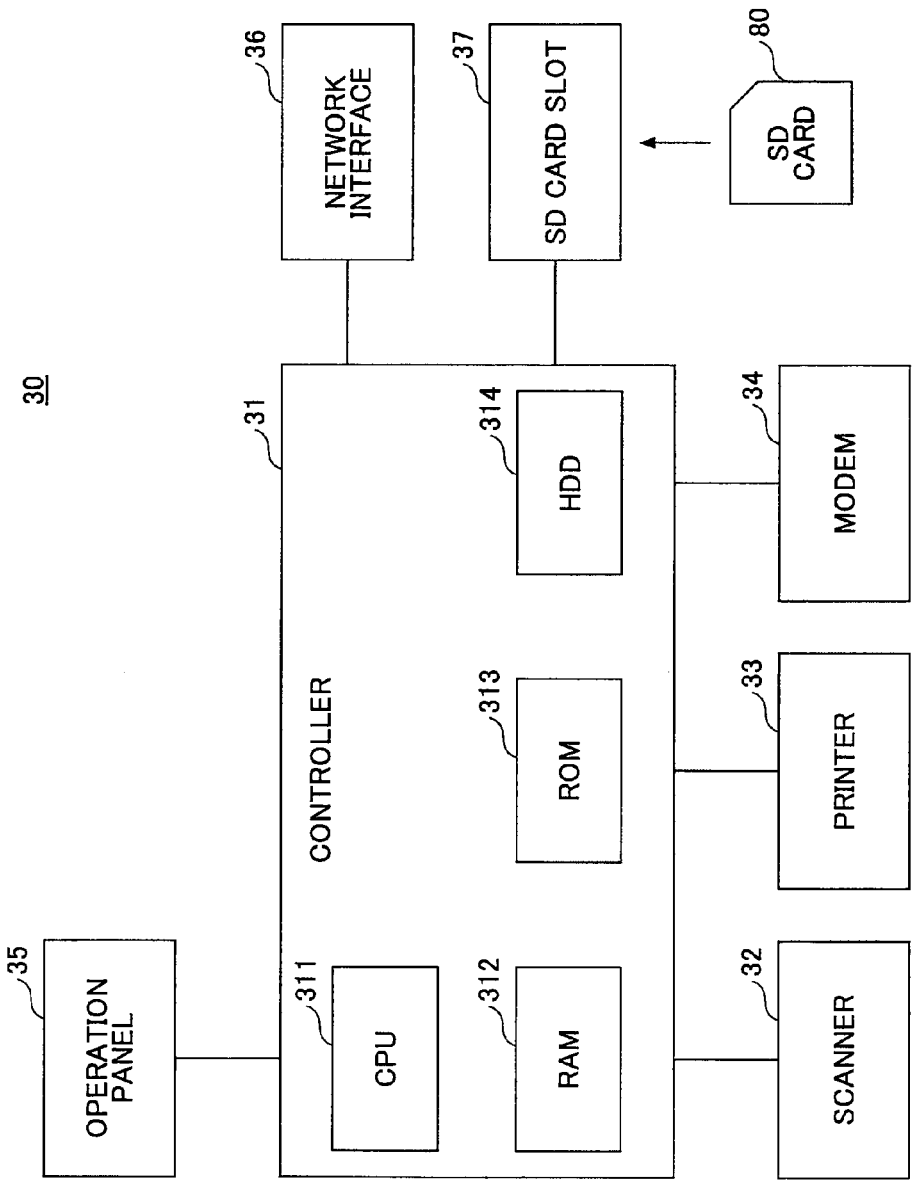
FIG. 22 is a diagram illustrating a hardware configuration example of an image forming apparatus according to the eighth embodiment.

Subsequently, each of hardware configurations of the image forming apparatus 30 and the user terminal 40 will be described. FIG. 22 is a diagram illustrating a hardware configuration example of the image forming apparatus according to the eighth embodiment. In FIG. 22, the image forming apparatus 30 includes hardware of a controller 31, a scanner 32, a printer 33, a modem 34, an operation panel 35, a network interface 36, an SD (Secure Digital) card slot 37, and the like.

The controller 31 includes a CPU (Central Processing Unit) 311, a RAM (Random Access Memory) 312, a ROM (Read-Only Memory) 313, a HDD (Hard Drive Disk) 314, and the like. The ROM 313 records various programs, data utilized by the programs, and the like. The RAM 312 is used as a storage area to load a program, a working area for the loaded program, and the like. The CPU 311 realizes various functions by processing the loaded program in the RAM 312. The HDD 314 records programs, data utilized in the programs, and the like.

The scanner 32 is hardware to scan image data from an original. The printer 33 is hardware to print out print data to a print sheet. The modem 34 is hardware to connect to a telephone line and is used to send and receive image data by facsimile communication. The operation panel 35 is hardware which includes an input part such as a button or the like to accept an input from the user and a display part such as a liquid crystal display part. The network interface 36 is hardware to connect to a network such as a LAN (Local Area Network) (regardless of a wired network and a wireless network). The SD card slot 37 is used to read out a program recorded in a SD card 80. That is, in the image forming apparatus 30, not only the program recorded in the ROM 313 but also the program recorded in the SD card 80 can be loaded into the RAM 312, and executed. It should be noted that another recording medium (for example, a CD-ROM (Compact Disk Read Only Memory), a USB (Universal Serial Bus) memory, or the like) can be substituted for the SD card 80. That is, a type of the recording medium corresponding to the SD card 80 is not limited to a specific type. In this case, the SD card slot 37 is substituted for by other hardware corresponding to the type of the recording medium.

Figure 23:
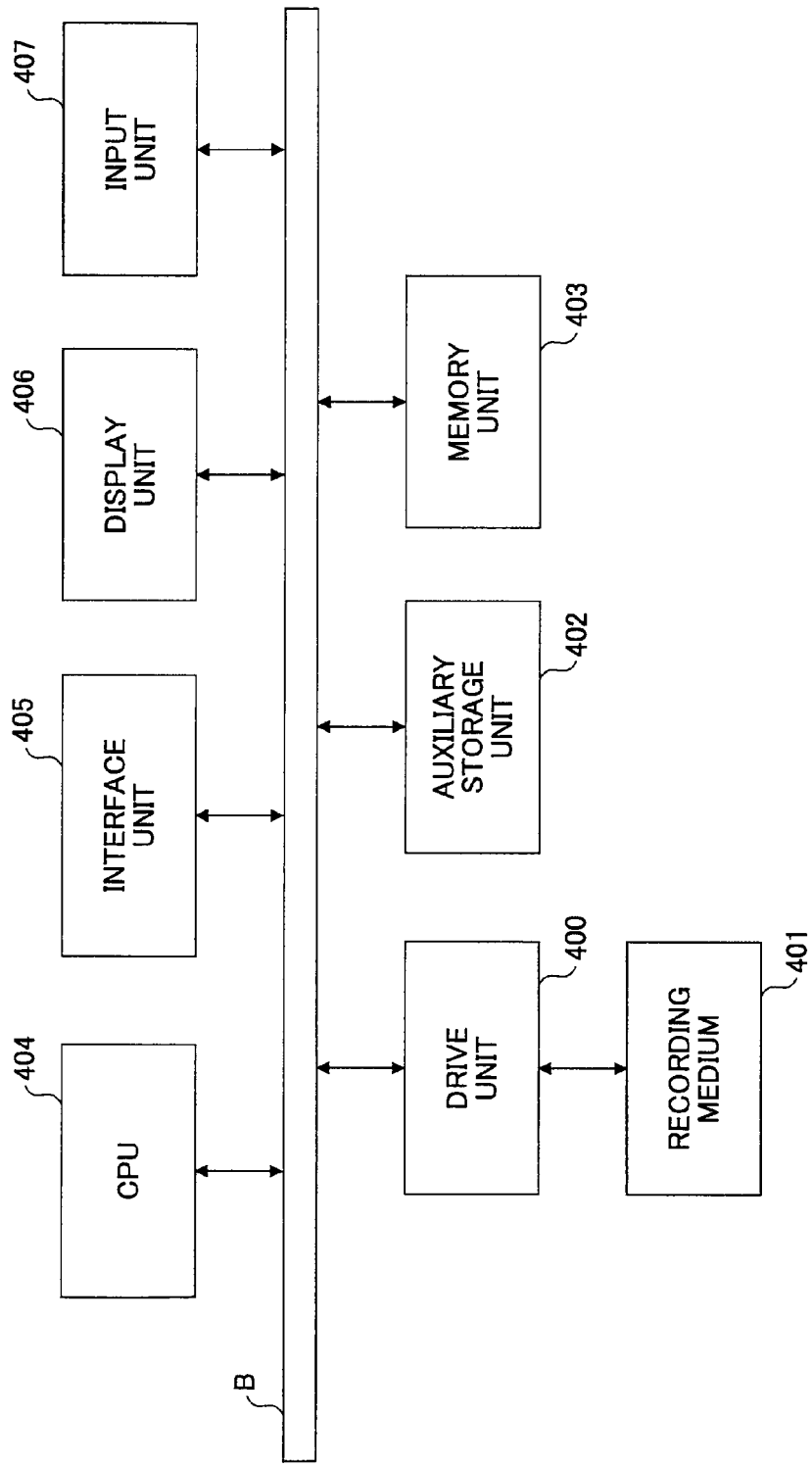
FIG. 23 is a diagram illustrating a hardware configuration example of a user terminal according to the eighth embodiment.

FIG. 23 is a diagram illustrating a hardware configuration example of a user terminal according to the eighth embodiment. The user terminal 40 in FIG. 23 includes a drive unit 400, an auxiliary storage unit 402, a memory unit 403, a CPU 404, an interface unit 405, a display unit 406, and an input unit 407.

A program to realize processes at the user terminal 40 is provided by a recording medium 401 such as a CD-ROM, a memory card, or the like. When the recording medium 401 recording the program is set in to the drive unit 400, the program is installed from the recording medium 401 into the auxiliary storage unit 402 via the drive unit 400. However, the program is not limited to be always installed from the recording medium 401, can be downloaded from another computer through the network. The auxiliary storage unit 402 stores necessary files, data, and the like as well as the installed programs.

When the program is indicated to be activated, the memory unit 403 reads out the program from the auxiliary storage unit 402. The CPU 404 realizes a function concerning the user terminal 40 in accordance with the program stored in the memory unit 403. The interface unit 405 includes one or more various communication interfaces, such as an interface for the network communication, an interface for a USB (Universal Serial Bus) connection, and an interface for a wireless communication such as Bluetooth, and the like. The display unit 406 displays GUIs (Graphical User Interfaces) or the like by each program. The input unit 407 includes a pointing device, a keyboard, a mouse, and the like, or buttons or the like, and is used to input various operating instructions.

Figure 24:
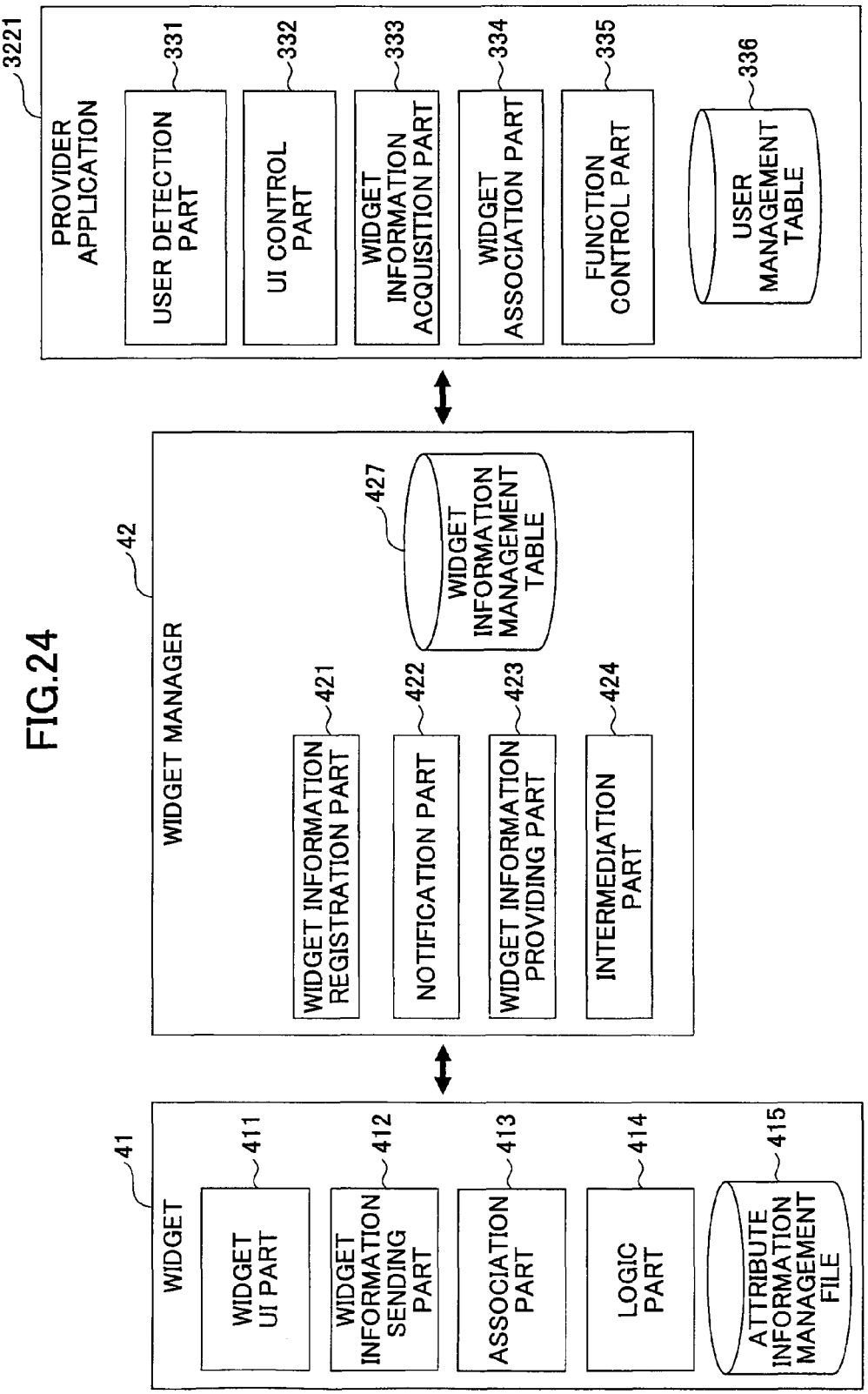
FIG. 24 is a diagram illustrating functional configuration examples of each of widgets, a widget manager, and a provider application.

Next, the widgets 41, the widget manager 42, and the provider application 3221 will be described in detail. FIG. 24 is a diagram illustrating functional configuration examples of each of the widgets 41, the widget manager 42, and the provider application 3221.

As illustrated in FIG. 24, each of the widgets 41 includes a widget UI part 411, a widget information sending part 412, an association part 413, a logic part 414, an attribute information management file 415, and the like.

The widget UI part 411 conducts various display controls and input controls concerning the widgets 41. For example, when one of widgets 41 is activated, the widget information sending part 412 sends a registration request of widget information to the widget manager 42. The association part 413 controls communications to associate with the provider application 3221. The attribute information management file 415 is a file to store attribute information concerning the widget 41. The attribute information includes setting information with respect to the widget 41. The setting information includes a set of parameters regulating operations of the widget 41 and contents of a job conducted by the widget 41. The logic part 414 is a part implemented in each of the widgets 41 as a specific function. For example, the logic part 414 of the print widget 41a for the marking sheet causes the image forming apparatus 30 to conduct the print job for printing out the marking sheet. The logic part 414 of the scan widget 41b for the form causes the image forming apparatus 30 to conduct the scan job concerning the marking sheet or the form. The logic part 414 of the scan widget 41b for the form stores the form image data in the user terminal, with the file name generated based on the scanned marking image data and the scanned form image data.

In the following, regarding process parts included in each of the widgets 41, in a case of distinguishing between process parts belonging to the print widget 41a for the marking sheet and process parts belonging to the scan widget 41b for the form, the former process parts are indicated by respective reference numbers with a suffix "a", and the latter process parts are indicated by respective reference numbers with a suffix "b". For example, the logic part 414 of the print widget 41a for the marking sheet is indicated by a "logic part 414a".

The widget manager 42 includes a widget information registration part 421, a notification part 422, a widget information providing part 423, an intermediation part 424, a widget information management table 427, and the like.

The widget information registration part 421 receives the registration request of the widget information sent from each of the widgets 41, and stores the widget information to the widget information management table 427. The widget information management table 427 is a table where the widget information of each of the widgets 41 being activated at the user terminal 40 is registered, and is recorded in the auxiliary storage unit 402 of the user terminal 40.

The notification part 422 conducts a notification (broadcast, multi-cast, or the like) concerning a user ID and the like included in the widget information received by the widget information registration part 421. The notification is issued by a user unit (a user ID unit). In this meaning, a notification issued by the notification part 422 is information to notify the image forming apparatus 30 of a user who is newly allowed to use one or more widgets 41.

The widget information providing part 423 provides (sends) the image forming apparatus 30 the widget information registered in the widget information management table 427, in response to a request from the image forming apparatus 30. The intermediation part 424 intermediates or relays communications between the widgets 41 and the provider application 3221.

The provider application 3221 includes a user detection part 331, a UI control part 332, a widget information acquisition part 333, a widget association part 334, a function control part 335, a user management table 336, and the like.

The user detection part 331 detects an absence of a user allowed to use the widgets 41, based on the notification issued from the widget manager 42, and registers the user ID and the like included in the notification into the user management table 336. The user management table 336 is a table by which the widgets 41 manage a list of users existing on the network.

The UI control part 332 accepts an input such as an operation indication from the user to the widgets 41. That is, the widgets 41 are arranged at the user terminal 40 but can be operated from the operation panel 35 of the image forming apparatus 30. The widget information acquisition part 333 acquires the widget information of the widgets 41, which belongs to a user selected from users registered in the user management table 336. The widget association part 334 controls communications with the widget manager 42. The function control part 335 controls an execution of a function requested from each of the widgets 41. A process for realizing the function is transferred to the standard application 321 or the SDK application 322.

In the following, a process of the information processing system 5 will be described. Prior to using the widgets 41, the user is required to activate the widget manager 42 at the user terminal 40. Accordingly, first, a process conducted when the widget manager 42 is activated will be described.

Figure 25:
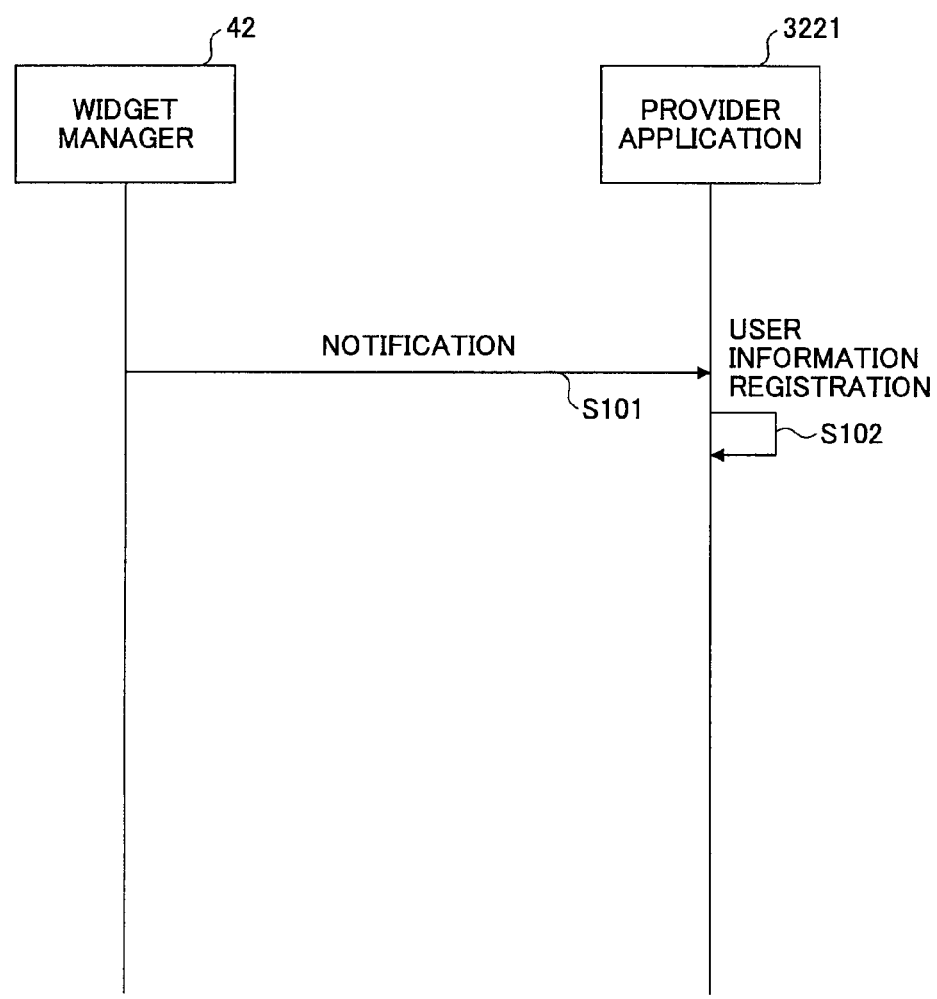
FIG. 25 is a sequence diagram for explaining a process when the widget manager is activated.

FIG. 25 is a sequence diagram for explaining the process when the widget manager 42 is activated.

When the widget manager 42 is activated in response to an indication of the user or automatically, the notification part 422 of the widget manager 42 sends the notification of the user information including the user ID of a login user and a URL to acquire the widget information (step S101).

Subsequently, when the user detection part 331 of the provider application 3221 receive the notification, the user detection part 331 registers the user ID and the URL to acquire the widget information included in the notification to the user management table 336 (step S102).

FIG. 26 is a diagram illustrating a configuration example of the user management table 336. As illustrated in FIG. 26, the user management table 336 manages a pair of the user ID and the URL to acquire the widget information. The URL to acquire the widget information is a unique URL for each widget manager 42. One widget manager 42 may be activated for one user terminal 40. That is, the widget manager 42 is shared by a plurality of the widgets 41. In FIG. 26, as a example, records concerning a user A and a user Bare registered. For example, the user management table 336 is recorded in the HDD 314.

After the widget manager 42 is activated, the user can utilize the print widget 41a for the marking sheet or the scan widget 41b for the form.

Figure 27:
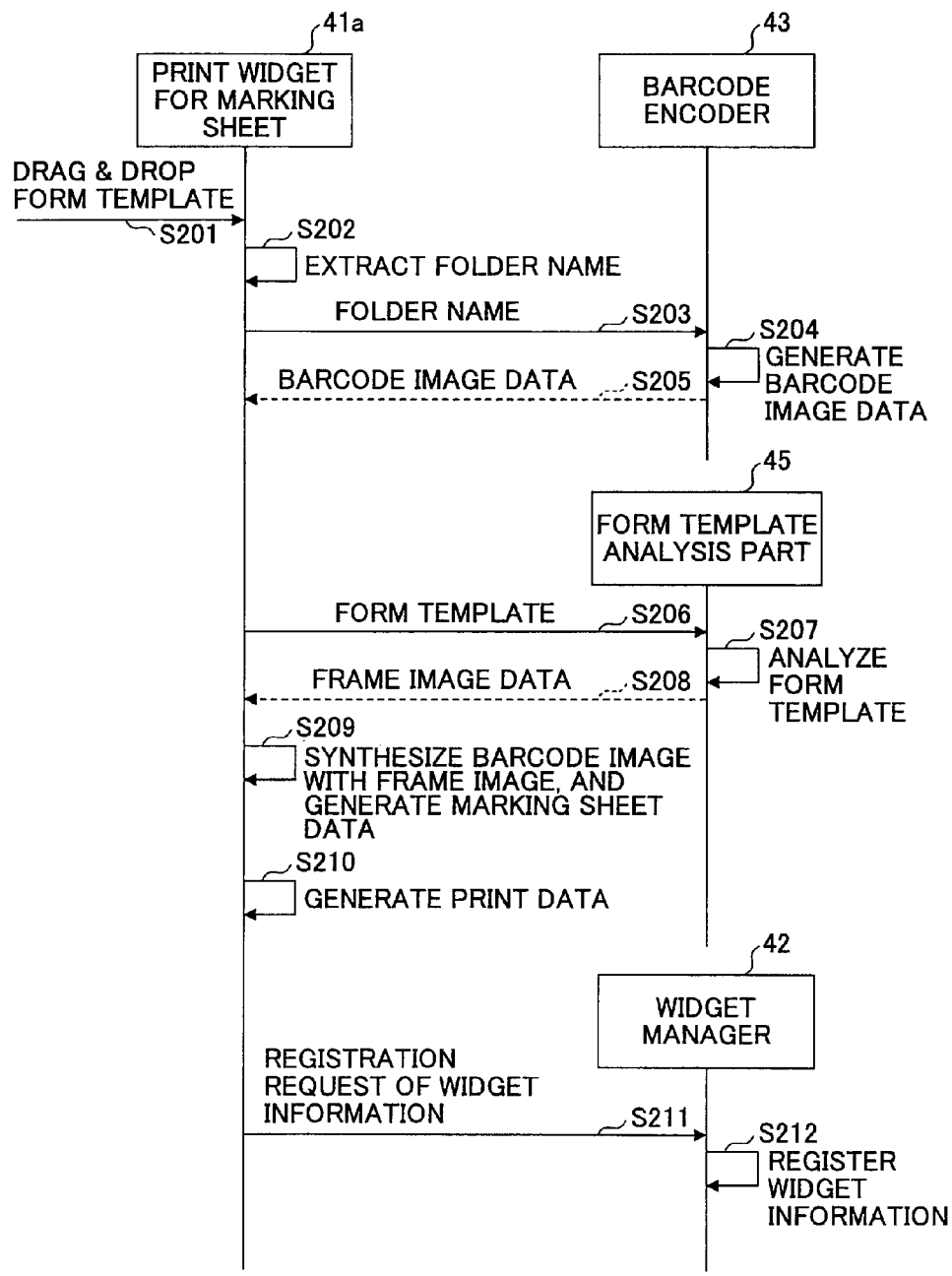
FIG. 27 is a sequence diagram for explaining a process when a job is input to a print widget for the marking sheet.

Subsequently, a process conducted when a job is input to the print widget 41a for the marking sheet will be described. FIG. 27 is a sequence diagram for explaining the process when the job is input to the print widget 41a for the marking sheet.

In response to an activation of the print widget 41a for the marking sheet, a widget UI part 411a displays an icon of the print widget 41a for the marking sheet at the display unit 406. By an operation of the user to the input unit 407 (mouse), when the form template data file is dragged and dropped onto the icon of the print widget 41a (step S201), a file path name of the form template data file being dropped is reported by the OS 47 to the widget UI part 411 of the print widget 41a for the marking sheet. It should be noted that the form template data file is a file where the form template data are stored.

Next, the logic part 414a of the print widget 41a for the marking sheet extracts a folder name (a path name of the folder) where the form template data file is stored, from the file path name (step S202). Then, the logic part 414a inputs the extracted folder name into the barcode encoder 43 (step S203). The barcode encoder 43 generates data (barcode image data) indicating a barcode image where the input folder name is embedded (step S204). A size (width and height) of the barcode image is defined by a predetermined size. After that, the barcode encoder 43 outputs the generated barcode image data to the logic part 414a (step S205).

Subsequently, the logic part 414a inputs the file path name of the form template data file being dropped by the user into the form template analysis part 45 (step S206). The form template analysis part 45 acquires the form template data from the form template data file according to the input file path name, and generates the frame image data of the form template by conducting a predetermined image process with respect to the form template data (step S207). Then, the form template analysis part 45 outputs the frame image data to the logic part 414a (step S208).

Subsequently, the logic part 414a synthesizes (superimposes) the barcode image indicated by the barcode image data at a predetermined position (for example, at an upper right) of the frame image indicated by the frame image data, and generates the marking sheet data (step S209). The marking sheet data are image data which are original data of the marking sheet. That is, by printing out the marking sheet data, the marking sheet is created. Subsequently, the logic part 414a generates the print data respectively to the marking sheet data and the form template data (step S210). The print data are data interpretable by the image forming apparatus 30. For example, the print data are generated by using a printer driver (not shown). However, there is a printer which can directly interpret predetermined image data such as TIFF (Tagged Image File Format) or the like. Accordingly, if the marking sheet data and the form template data are data formats which the image forming apparatus 30 can interpret, the step S210 may not be always conducted.

After that, the print widget 41a for the marking sheet of a widget information sending part 412a sends the registration request of the widget information including print data of the marking sheet, and print data of the form template data to the widget manager 42 (step S211). The widget information is registered into the widget manager 42 (step S212). The widget information of the print widget 41a for the marking sheet corresponds to the attribute information concerning the input job. Also, identification information (for example, a URL (Uniform Resource Locator) or the like of the widget manager 42) is set beforehand in each of the widgets 41.

FIG. 28 is a diagram illustrating an example of the widget information of the print widget 41a for the marking sheet. In FIG. 28, the widget information of the print widget 41a for the marking sheet includes a widget ID, the user ID, an association function identification, a widget address, a display name, setting information, print data, and the like.

The widget ID is identification information for uniquely identifying each of the widgets 41. The user ID is identification information of the user who possesses the print widget 41a for the marking sheet. The association function identification is information for identifying a necessary function (that is, a function which the print widget 41a for the marking sheet uses) of the image forming apparatus 30 associated with the print widget 41a for the marking sheet. As an example of the association function identification, "print" and "scan" may be used. The "print" indicates the print function. The "scan" indicates the scan function. The print widget 41a for the marking sheet uses the print function of the image forming apparatus 30. Thus, in an example in FIG. 28, the "print" is set as the association function identification. The widget address is identification information (for example, a URL or the like) for uniquely identifying each of the widgets 41 in the network communications. A display name is a character string to display a name of the print widget 41a for the marking sheet.

Setting information is information concerning the print job of the marking sheet, and is stored in the attribute information management file 415 of the print widget 41a for the marking sheet. For example, a size of a sheet may be a parameter in the setting information. The print data of the marking sheet data and the print data of the form template data are included in the widget information.

The widget information, which is sent from the widget information sending part 412a of the print widget 41a for the marking sheet in the step S211, is received by the widget information registration part 431 of the widget manager 42. The widget information registration part 421 registers the widget information in the widget information management table 427 corresponding to the user ID included in the received widget information (step S212). By this process, a job of the print widget 41a for the marking sheet is registered in the widget manager 42.

After the user inputs the job to the print widget 41a for the marking sheet at the user terminal 40, the user moves to a place of the image forming apparatus 30 to execute the job. In a case where a plurality of the image forming apparatuses 30 are connected to the network, the same notification is received by the user detection part 331 of each of the image forming apparatuses 30, and the user ID and the URL to acquire the widget information are registered in the user management table 336 of each of the image forming apparatus 30. Accordingly, if the image forming apparatuses 30 include the print function, the user can conduct the job from any one of the plurality of the image forming apparatuses 30.

Figure 29:
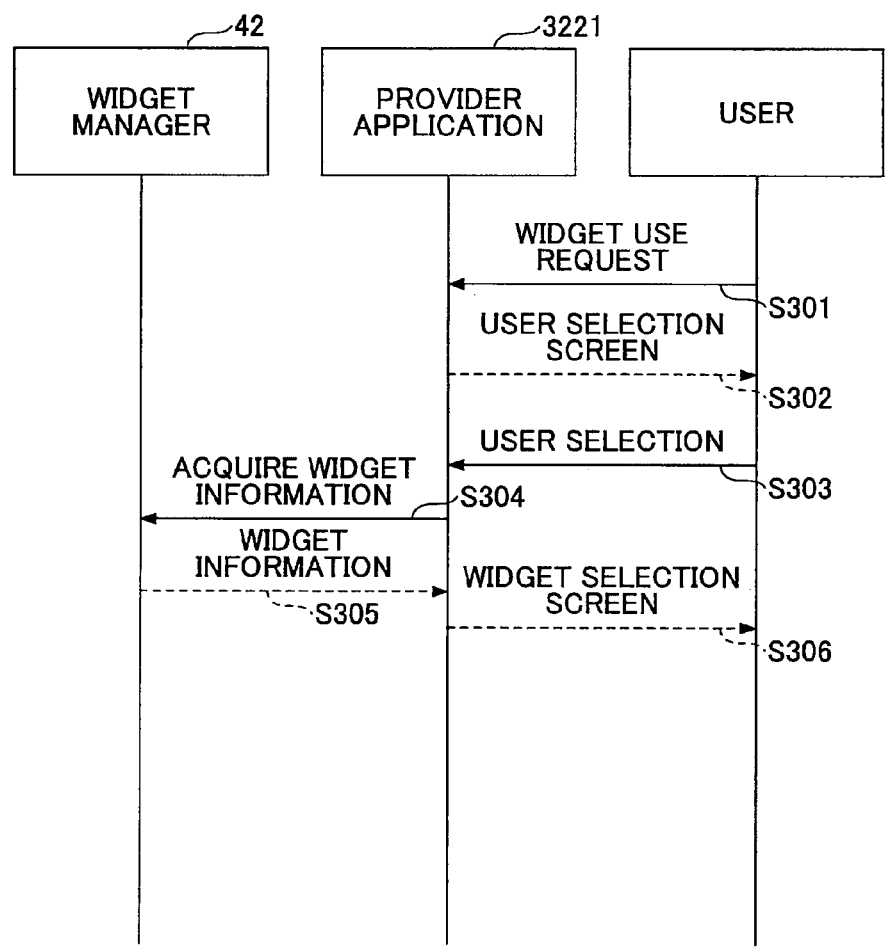
FIG. 29 is a sequence diagram for explaining a process for displaying a list of available widgets.

Next, a process conducted in response to an operation of the user at the image forming apparatus 30 will be described. FIG. 29 is a sequence diagram for explaining a process for displaying a list of available widgets.

When a use indication of the provider application 3221 is input by the user via the operation panel 35 (step S301), the UI control part 332 of the provider application 3221 displays a user selection screen at the operation panel 35 based on information registered in the user management table 336 (step S302).

Figure 30:
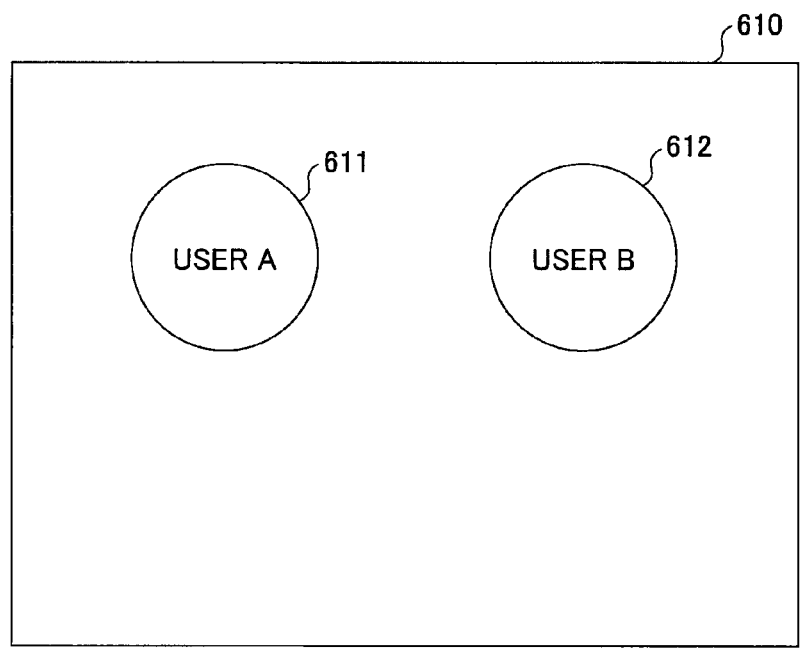
FIG. 30 is a diagram illustrating a display example of a user selection screen.

FIG. 30 is a diagram illustrating a display example of the user selection screen. In a user selection screen 610 illustrated in FIG. 30, a button is displayed for each user ID. For example, a button 611 corresponding to a user A and a button 612 corresponding to a user B are displayed.

Subsequently, a user presses a button corresponding to the user ID of the user at the user selection screen 610 (step S303). When the button is pressed, the widget information acquisition part 333 acquires the URL to acquire the widget information, in which the URL is associated with the user ID corresponding to the selected button. In response to pressing the button corresponding to the user ID, the user is authenticated. If the user is successfully authenticated, the following process is conducted.

Subsequently, the widget information acquisition part 333 sends an acquisition request of the widget information to the URL to acquire the widget information, the URL corresponding to the selected user ID (step S304). The acquisition request of the widget information is received by the widget information providing part 423 of the widget manager 42. The widget information providing part 423 acquires a list of the widget information registered in the widget information management table 427 corresponding to the URL to acquire the widget information (that is, the widget information management table 427 corresponding to the user operating the image forming apparatus 30), and sends the list of the widget information back to the provider application 3221 (step S305). When the list of the widget information is sent, the widget information providing part 423 generates a URL to relay communications between the provider application 3221 and the widgets 41 for each of the widgets 41 (each set of the widget information). Hereinafter, the generated URL is called a "URL to relay to the widget". The widget information providing part 423 additionally provides the generated URL to relay to the widget for each of the widgets, the widget information corresponding to the widgets. Then, the widget information providing part 423 sends the list of the widget information to which the generated URL to relay to the widget is additionally provided, to the provider application 3221. For example, the widget information sent in the step S305 is configured as illustrated in FIG. 31.

FIG. 31 is a diagram illustrating a configuration example of the widget information of the print widget for the marking sheet which is sent from the widget manager to the provider application.

In the widget information illustrated in FIG. 31, the URL to relay to the widget is additionally included with respect to the widget information illustrated in FIG. 28. The widget information in FIG. 31 does not include the substance of a job. That is, the setting information and the print data are not included. At this point, a job to be executed is not determined, and then the substance of the job is not required to be transferred. In the step S305, the list of the widget information as illustrated in FIG. 31 is sent. Even if only one set of the widget information is included, the list of the widget information is maintained for the one set of the widget information. As described later, in a case where the scan widget 41b for the form is activated at the user terminal 40, the list includes the widget information of the scan widget 41b for the form.

Subsequently, the UI control part 332 of the provider application 3221 records the received list of the widget information in the RAM 312, and displays a screen (widget selection screen) including a list of the widgets 41 available for the user based on the list of the widget information (step S306).

Figure 32:
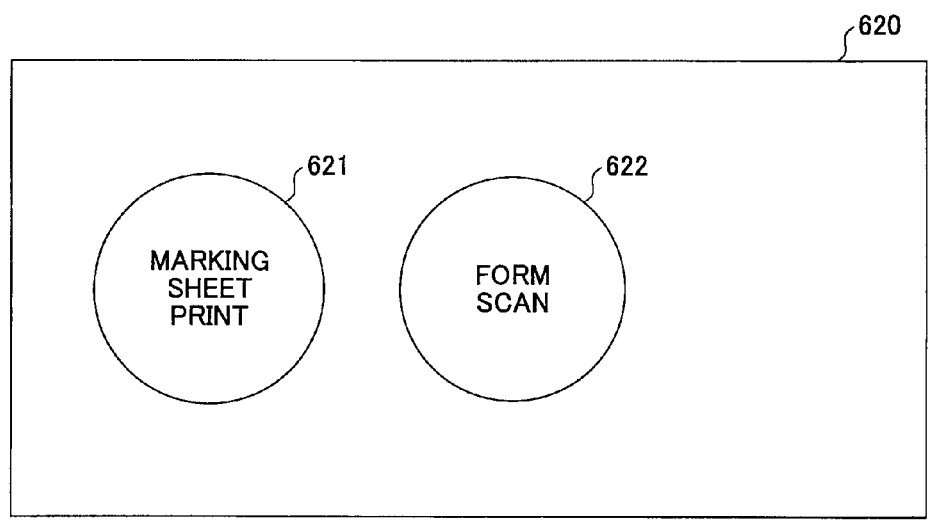
FIG. 32 is a diagram illustrating a display example of a widget selection screen.

FIG. 32 is a diagram illustrating a display example of the widget selection screen. In the widget selection screen 620 in FIG. 32, a button 621 corresponds to the print widget 41a for the marking sheet and a button 622 corresponds to the scan widget 41b for the form. That is, FIG. 32 illustrates the display example of the widget selection screen 620 when the widget information of the print widget 41a for the marking sheet and the widget information of the scan widget 41b for the form are received in the step S305.

Figure 33:
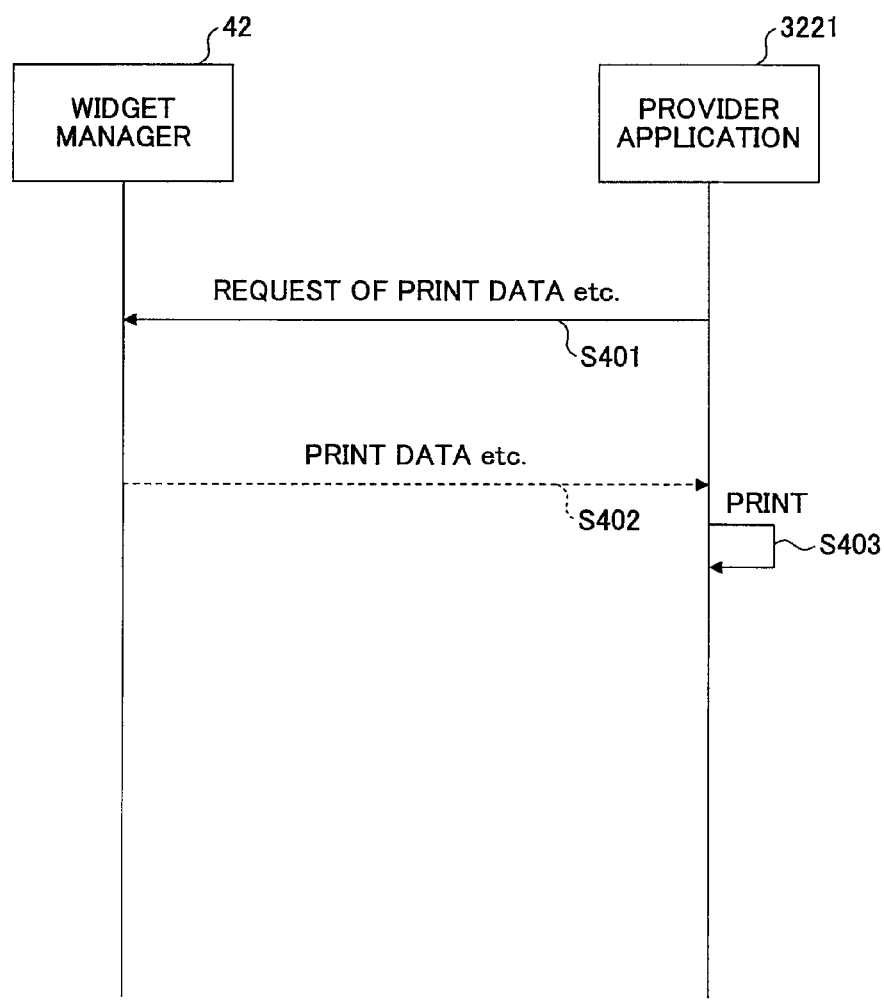
FIG. 33 is a sequence diagram for explaining a process when the print widget for the marking sheet is executed.

When the button 621 is pressed at the widget selection screen 620 and a start key of the operation panel 35 is pressed, a process illustrated in FIG. 33 is started.

FIG. 33 is a sequence diagram for explaining a process when the print widget 41a for the marking sheet is executed.

The widget association part 334 recognizes to execute a print, based on an association function identification ("print") included in the widget information (hereinafter, called "current widget information") corresponding to the button 621 pressed by the user. It is required to obtain the substance of the job to execute the print. The widget association part 334 sends a request for sending the print data and the setting information, to the URL to relay to the widget which is included in the current widget information (step S401).

The intermediation part 424 of the widget manager 42 receives the request for sending the print data and the setting information. The intermediation part 424 acquires the print data and the setting information from widget information corresponding to the URL to relay to the widget, from multiple sets of the widget information registered in the widget information management table 427. The print data for the marking sheet data and the print data for the form template data are acquired. The intermediation part 424 sends the acquired print data and setting information back to the widget association part 334 of the provider application 3221 (step S402).

The widget association part 334 receives and inputs the print data corresponding to the marking sheet data and to the form template data and the setting information to the function control part 335. Subsequently, the function control part 335 causes the print application 3212 to conduct a print job based on the input print data and the input setting information (step S403). As a result, the printer 33 outputs a print sheet on which a print image is formed based on the setting information and the print data. In detail, the marking sheet is printed out based on the print data for the marking sheet data. A barcode and a frame image are recorded on the marking sheet. A blank form is also printed out based on the form template data.

The user fills in the necessary items on the printed form. In order to store the printed form whose items are supplied by the user, the user puts the marks on the marking sheet. Similar to the fourth embodiment, the marks are placed in the rectangle indicating the marking area. After that, the form is digitized and stored by utilizing the scan widget 41b for the form and the image forming apparatus 30.

Figure 34:
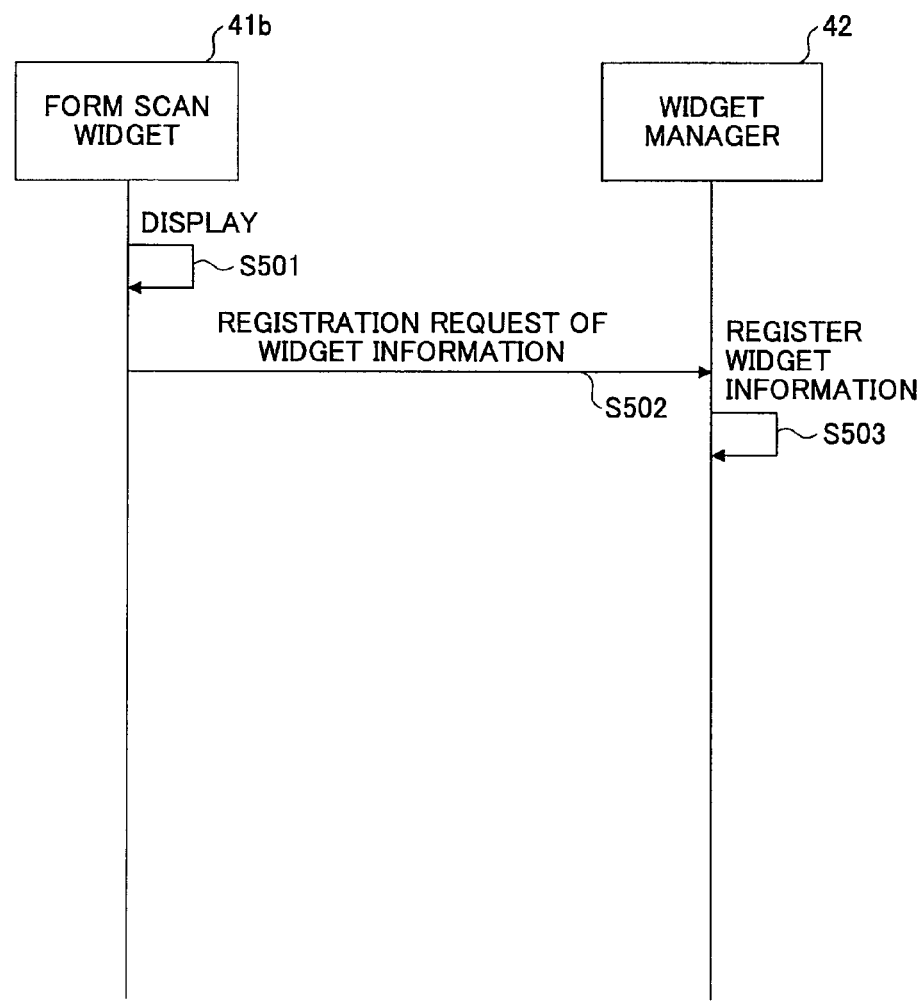
FIG. 34 is a sequence diagram for explaining a process when a scan widget for the form is activated.

Next, an operation of the scan widget 41b for the form will be described. FIG. 34 is a sequence diagram for explaining a process when the scan widget 41b for the form is activated.

In response to an indication for activating the scan widget 41b for the form, which is input by the user at the user terminal 40, a display control part 2111b of the scan widget 41b for the form displays an icon of the scan widget 41b for the format the display unit 406 (step S501). Subsequently, the widget information sending part 412 of the scan widget 41b for the form acquires the widget information from the attribute information management file 415b, and sends a registration request of the widget information to the widget manager 42 (step S502).

FIG. 35 is a diagram illustrating a configuration example of the widget information of the scan widget 41b for the form. A configuration of the widget information illustrated in FIG. 35 is approximately similar to that of the widget information of the print widget 41a for the marking sheet which is described with reference to FIG. 28. However, the print data are not included in the widget information of the scan widget 41b for the form. A configuration of the setting information with respect to the scan widget 41b for the form is different from that of the setting information with respect to the print widget 41a for the marking sheet. The scan widget 41b for the form utilizes the scan function of the image forming apparatus 30. Accordingly, a value of the association indication indicates "scan".

In the step S502, the widget information is sent by the widget information sending part 412b of the scan widget 41b for the form and is received by the widget information registration part 421 of the widget manager 42. The widget information registration part 421 registers the received widget information in the widget information management table 427 corresponding to the user ID included in the received widget information (step S503).

The widget information of the scan widget 41b for the form is registered in the widget manager 42.

After that, the user moves to a place of the image forming apparatus 30 to conduct the scan widget 41b for the form. Similar to the print widget 41a for the marking sheet, since the notification is received, the user can conduct the scan widget 41b for the form from any one of a plurality of the image forming apparatuses 30 including the scan function.

A process procedure until the widget selection screen 62 is displayed by an operation of the user via the operation panel 35 of the image forming apparatus is conducted as described with reference to FIG. 29. By the process procedure in FIG. 29, the widget information of the scan widget 41b for the form, which is registered in the widget manager 42, is transferred to the image forming apparatus 30. In the widget information, the URL to relay to the widget is additionally provided in the widget information illustrated in FIG. 35. Based on the widget information, at the widget selection screen 620, the button 622 corresponding to the scan widget 41b for the form is displayed as illustrated in FIG. 32.

A process procedure concerning the scan widget 41b for the form, which is executed after the widget selection screen 620 is displayed, will be described with reference to FIG. 36. FIG. 36 is a sequence diagram for explaining the process procedure when the scan widget 41b for the form is executed.

First, the marking sheet and the form being overlaid together are set as an original at the ADF of the image forming apparatus 30. It should be noted that the marking sheet is printed out by utilizing the print widget 41a for the marking sheet, and the marking is conducted by the user on the printed marking sheet. Also, the form is printed out by utilizing the print widget 41a for the marking sheet, and is filled out by the user. In a state where the marking sheet and the form are set at the ADF, at the widget selection screen 620, the button 622 corresponding to the scan widget 41b for the form is selected (step S601). The widget association part 334 of the provider application 3221 recognizes to conduct a scan, based on the association function identification ("scan") included in the widget information (hereinafter, called "current widget information") corresponding to the button 622 pressed by the user. Accordingly, the widget association part 334 requests the function control part 335 to conduct the scan.

The function control part 335 causes the scan application 3211 to conduct a scan job based on the setting information included in the current widget information (step S602). The scan application 3211 causes the scanner 32 to scan the marking sheet and the form set together at the image forming apparatus 30, and outputs image data (the marking image data and the form image data) to the widget association part 334 as a result. In the following, the marking image data and the form image data are generically called "scanned image data".

The widget association part 334 sends the scanned image data to the URL to relay to the widget, which is included in the current widget information (step S603). The scanned image data sent to the URL to relay to the widget are received by the intermediation part 424 of the widget manager 42.

On the other hand, after the widget information is sent, the scan widget 41b for the form conducts polling to confirm that the image data are scanned at the image forming apparatus 30, and waits until the image data are transferred (sent back). In detail, an association part 413b of the scan widget 41b for the form sends an acquisition request of scanned image data to the intermediation part 424 of the widget manager 42 (step S511). The intermediation part 424 responds to the acquisition request (step S512).

That is, in response to the acquisition request in the step S511 which is received after the scanned image data are received, the intermediation part 424 sends the scanned image data received concerning the URL to relay to the widget of the scan widget 41b of an acquisition request originator for the form, back to the association part 413b of the scan widget 41b for the form in the step S512.

When the scanned image data are received, the association part 413b inputs the received scanned image data into a logic part 414b. The logic part 414b inputs the marking image data into the barcode decoder 44 (step S513). The barcode decoder 44 extracts a folder name from the barcode image included at a predetermined position in the marking image data (step S514), and outputs the folder name to the logic part 414b (step S515).

Subsequently, the logic part 414b inputs the marking image data, the form image data, and the folder name output from the barcode decoder 44 (step S516). For example, by applying the process described in the fourth embodiment and the like, the file name generation part 46 generates the file name corresponding to the form image data based on the marking image data and the form image data (step S517). The file name generation part 46 outputs the generated file name to the logic part 414b (step S518).

When a difference between the marking image and the frame image is extracted, the file name generation part 46 acquires the form template data from a folder specified by the folder name being input, and generates the frame image data based on the form template data. The file name generation part 46 extracts the difference between the frame image indicated by the frame image data and the marking image indicated by the input marking image data. The file name generation part 46 detects a position, where the marking is conducted, with respect to the marking sheet based on the extracted difference.

Next, the logic part 414b stores the form image data into the auxiliary storage unit 402 (step S519). In detail, the logic part 414b generates a file concerning the file name output from the file name generation part 46, under the folder specified by the folder name output from the barcode decoder 44, and records the form image data in the file. The marking image data may be discarded, or stored in another folder separately from the form image data.

As described above, according to the eighth embodiment, a process workload of the image forming apparatus 30 can be reduced. That is, a process for generating an image to be printed out on the marking sheet, an image process for the marking image and the form image, and the like are conducted by the user terminal 40. Accordingly, in the eighth embodiment, the user terminal 40 corresponds to an example of an image processing apparatus. Also, the form image data can be stored in any one of the user terminals 40 of the user.

The folder name embedded in the barcode included in the marking image data is a folder name of the folder in which the form template data are stored. Accordingly, in the eighth embodiment, the form image data are stored in the same folder where the form template data corresponding to the form image data are stored. That is, it is considered that in general, a template file, a format file, or the like tend to be organized and stored with a file in which contents are filled by the user, in the same folder. The form image data can be stored in a folder different from that of the form template data. For example, the form template data are stored in one folder named "xxx/template", and the form image data are stored in another folder named "xxx/data". In this case, the logic part 414b stores the form image data in a folder specified by one folder name which is acquired by processing other folder name output from the barcode decoder 44. In the above example, the one folder name, which is acquired by processing the another folder name output from the barcode decoder 44, is a folder name acquired by embedding "data" in a portion "template". For example, "xxx" is a character string indicating a type of the form.

In the eighth embodiment, the example of applying the marking sheet including the frame image is explained. The marking sheet excluding the frame image can be used. That is, the marking sheet records a barcode image alone, in which the folder name is embedded. In this case, the process conducted by the form template analysis part 45 is not required. In addition, the file name generation part 46 conducts any one of processes described in the first through third embodiments.

Moreover, the folder name embedded in the barcode recorded in the marking sheet can be determined irrespective of the form template data. For example, the folder name can be set in the attribute information management file 415 of the print widget 41a for the marking sheet. Alternatively, for example, the folder name can be set through a setting screen of the print widget 41a for the marking sheet which is displayed in response to an operation to the icon of the print widget 41a for the marking sheet.

Furthermore, the print widget 41a for the marking sheet may not always determine the form template data as a print subject. In this case, the marking data alone which includes the barcode image is determined as the print subject.

According to the present invention, it is possible to indicate an area of character recognition without degrading a condition of a document subject to the character recognition.

The present invention is not limited to the specifically disclosed embodiments, and variations and modifications may be made without departing from the scope of the invention.

The present application is based on the Japanese Priority Patent Applications No. 2009-205157 filed on Sep. 4, 2009, and No. 2010-029358 filed on Feb. 12, 2010 the entire contents of which are hereby incorporated by reference.

What is claimed is:

1. An image processing apparatus, comprising:
a reader configured to read multiple sheets, including a first sheet and a second sheet, and to generate image data;
an identifier configured to identify first image data scanned from the first sheet and second image data scanned from the second sheet in the image data generated from reading the multiple sheets, based on determining which one of the first sheet and the second sheet includes a predetermined symbol, the identifier distinguishing between the first image data and the second image data;
a marking position detector configured to detect a marking position with respect to the first sheet based on the first image data scanned from the first sheet; and
a first character recognizer configured to conduct a first character recognition with respect to an area specified based on the marking position, for the second image data scanned from the second sheet.

2. The image processing apparatus as claimed in claim 1, further comprising an identification generator configured to generate identification of the second image data based on a first result of the first character recognition conducted by the first character recognizer.

3. The image processing apparatus as claimed in claim 2, further comprising a second character recognizer configured to conduct a second character recognition with respect to the area in the second image data,
wherein the identification generator controls a generation process of the identification based on a second result of the second character recognition conducted by the second character recognizer.

4. The image processing apparatus as claimed in claim 3, wherein character types identifiable by the second character recognizer are fewer than character types identifiable by the first character recognizer.

5. The image processing apparatus as claimed in claim 2, wherein the first image data is marking image data, and the second image data is form image data.

6. The image processing apparatus as claimed in claim 1, further comprising a corrector configured to detect feature information of the second image data and correct the area based on the feature information.

7. The image processing apparatus as claimed in claim 1, further comprising an extractor configured to extract a character string from a barcode included in the first image data,
wherein the second image data are stored at a storage location indicated by the character string.

8. The image processing apparatus as claimed in claim 1, wherein the first image data include a figure read out from the first sheet, and
the first character recognizer conducts the first character recognition for an area specified based on the figure concerning the marking position.

9. The image processing apparatus as claimed in claim 1, further comprising a second character recognizer configured to conduct a second character recognition for the area in the second image data; and
an XML data outputter configured to output XML data in which a second result of the second character recognition by the second character recognizer and a first result of the first character recognition by the first character recognizer are associated with each other.

10. The image processing apparatus as claimed in claim 1, further comprising an identification generator configured to generate an identification name of the second image data based on linking information acquired from the first image data and a first result of the first character recognition conducted by the first character recognizer,
wherein the first image data is marking image data, and the second image data is form image data.

11. The image processing apparatus as claimed in claim 1, wherein the multiple sheets are read during a single read operation.

12. The image processing apparatus as claimed in claim 1, wherein the marking position is detected based only on the first image data, which is marked entry image data, and absent input from the second image data, which is form template image data.

13. The image processing apparatus as claimed in claim 1, wherein the marking position is detected based only on the first image data, which is marked entry image data, prior to recognizing the second image data, which is form template image data.

14. The image processing apparatus as claimed in claim 1, wherein the marking position is obtained based only on the first image data, which is marked entry image data, in the first sheet, and the marking position is used to recognize the area, which corresponds to the marking position, in the second image data, the second image data being form template image data.

15. An image processing system including a first program, a second program, and an image forming apparatus, each of the first and second programs being stored on a non-transitory computer-readable storage medium, wherein:
the first program causes a computer to execute codes for:
reading multiple sheets including a first sheet and a second sheet, by the image forming apparatus, and generating image data including a barcode embedding a character string; and
causing the image forming apparatus to print out the image data,
the second program causes the computer to execute the codes for:
receiving, from the image forming apparatus, first image data scanned from a first sheet on which the image data are printed out, and second image data scanned from a second sheet;
extracting the character string from the barcode included in the first image data;
identifying the first image data scanned from the first sheet and the second image data scanned from the second sheet in the image data generated from reading the multiple sheets, based on determining which one of the first sheet and the second sheet includes a predetermined symbol, the identifying distinguishing between the first image data and the second image data;
detecting a marking position with respect to the first sheet based on the first image data;
conducting character recognition for an area specified based on the marking position in the second image data;
generating identification of the second image data based on a result of conducting the character recognition; and
storing the second image data at a storage location indicated by the character string, by associating the character string with the identification.

16. An image processing method conducted by an image forming apparatus, said image processing method comprising:
- reading multiple sheets, including a first sheet and a second sheet, to generate image data;
- identifying first image data scanned from the first sheet and second image data scanned from the second sheet in the image data generated from reading the multiple sheets, based on determining which one of the first sheet and the second sheet includes a predetermined symbol, the identifying distinguishing between the first image data and the second image data;
- detecting a marking position with respect to the first sheet based on the first image data scanned from the first sheet; and
- conducting character recognition for an area specified based on the marking position in the second image data scanned from the second sheet.

\* \* \* \* \*

UNITED STATES PATENT AND TRADEMARK OFFICE
CERTIFICATE OF CORRECTION

PATENT NO. : 8,605,336 B2
APPLICATION NO. : 12/872243
DATED : December 10, 2013
INVENTOR(S) : Hirohisa Inamoto et al.

It is certified that error appears in the above-identified patent and that said Letters Patent is hereby corrected as shown below:

On the title page, Item (54) and in the specifications, column 1, lines 1-4, the title is incorrect. Item (54) and column 1, lines 1-4 should read:

--IMAGE PROCESSING APPARATUS, IMAGE PROCESSING SYSTEM, AND IMAGE PROCESSING METHOD CAPABLE OF CONDUCTING CHARACTER RECOGNITION WITH RESPECT TO IMAGE DATA--

Signed and Sealed this
Twenty-fifth Day of February, 2014

Michelle K. Lee
*Deputy Director of the United States Patent and Trademark Office*